United States Patent
Smith

(10) Patent No.: US 10,454,963 B1
(45) Date of Patent: Oct. 22, 2019

(54) HISTORICAL EXPLOIT AND VULNERABILITY DETECTION

(71) Applicant: Tripwire, Inc., Portland, OR (US)

(72) Inventor: Travis Smith, Portland, OR (US)

(73) Assignee: Tripwire, Inc., Portland, OR (US)

( * ) Notice: Subject to any disclaimer, the term of this patent is extended or adjusted under 35 U.S.C. 154(b) by 120 days.

(21) Appl. No.: 15/225,639

(22) Filed: Aug. 1, 2016

Related U.S. Application Data

(60) Provisional application No. 62/199,973, filed on Jul. 31, 2015.

(51) Int. Cl.
*H04L 29/06* (2006.01)
*G06F 16/951* (2019.01)
*G06F 16/2458* (2019.01)

(52) U.S. Cl.
CPC ...... *H04L 63/1433* (2013.01); *G06F 16/2477* (2019.01); *G06F 16/951* (2019.01); *H04L 63/1416* (2013.01); *H04L 63/1425* (2013.01); *H04L 63/1441* (2013.01)

(58) Field of Classification Search
CPC ............. H04L 63/1433; H04L 63/1416; H04L 63/1425; H04L 63/1441; G06F 17/30551; G06F 17/30864; G06F 16/2477; G06F 16/951
See application file for complete search history.

(56) References Cited

U.S. PATENT DOCUMENTS

| | | | |
|---|---|---|---|
| 7,243,348 B2 | 7/2007 | Good et al. | |
| 7,316,016 B2 | 1/2008 | DiFalco | |
| 7,360,099 B2 | 4/2008 | DiFalco et al. | |
| 7,587,754 B2 | 9/2009 | DiFalco et al. | |
| 7,620,715 B2 | 11/2009 | DiFalco et al. | |
| 7,765,460 B2 | 7/2010 | DiFalco et al. | |
| 7,822,724 B2 | 10/2010 | DiFalco et al. | |
| 8,140,635 B2 | 3/2012 | DiFalco | |
| 8,176,158 B2 | 5/2012 | DiFalco et al. | |
| 8,566,823 B2 | 10/2013 | Wagner et al. | |
| 8,600,996 B2 | 12/2013 | Good et al. | |
| 8,712,815 B1 | 4/2014 | Nichols et al. | |
| 8,819,491 B2 | 8/2014 | Whitlock et al. | |
| 8,862,941 B2 | 10/2014 | Whitlock et al. | |
| 8,868,987 B2 | 10/2014 | Wagner | |
| 8,874,707 B1 | 10/2014 | Quilter et al. | |
| 8,875,129 B2 | 10/2014 | Wagner et al. | |
| 8,914,341 B2 | 12/2014 | DiFalco | |

(Continued)

*Primary Examiner* — Sarah Su
(74) *Attorney, Agent, or Firm* — Klarquist Sparkman, LLP

(57) ABSTRACT

Disclosed herein are representative embodiments of methods, apparatus, and systems for improving the functioning of IT assets in an IT infrastructure. The embodiments help secure and protect against outside cybersecurity attacks on IT assets and infrastructures, such as internet-centric attacks. Particular embodiments comprise detecting exploitable vulnerabilities of IT assets of an IT infrastructure, using the observed vulnerability data together with collected event log data to determine whether a respective vulnerability has actually been exploited for an asset, integrating change audit data and third-party threat data with the vulnerability data for exploited vulnerabilities, generating user interfaces/reports that display selected aspects of the integrated data, and/or modifying the asset to address the exploited vulnerability in response.

19 Claims, 19 Drawing Sheets

(56) References Cited

U.S. PATENT DOCUMENTS

| | | |
|---|---|---|
| 8,918,883 B1 | 12/2014 | Boyle et al. |
| 8,996,684 B2 | 3/2015 | Good et al. |
| 9,026,646 B2 | 5/2015 | Whitlock et al. |
| 9,197,604 B1 | 11/2015 | Quilter et al. |
| 9,209,996 B2 | 12/2015 | DiFalco |
| 9,256,841 B2 | 2/2016 | DiFalco et al. |
| 9,280,667 B1 | 3/2016 | Keanini et al. |
| 9,304,850 B1 | 4/2016 | Whitlock et al. |
| 9,323,549 B2 | 4/2016 | Wagner et al. |
| 9,392,007 B2* | 7/2016 | Giokas ............... H04L 63/1425 |
| 9,509,554 B1 | 11/2016 | Whitlock et al. |
| 9,509,711 B1 | 11/2016 | Keanini et al. |
| 9,634,951 B1 | 4/2017 | Hunt et al. |
| 9,680,707 B2 | 6/2017 | Torrence et al. |
| 9,741,017 B2 | 8/2017 | Good et al. |
| 9,766,873 B2 | 9/2017 | Steigleder |
| 9,781,046 B1 | 10/2017 | Pawlukowsky et al. |
| 9,853,994 B2* | 12/2017 | Sakakibara ............ G06F 11/34 |
| 9,922,055 B2 | 3/2018 | Whitlock et al. |
| 9,992,230 B1 | 6/2018 | Haverty et al. |
| 10,013,420 B1 | 7/2018 | DeFalco |
| 10,158,660 B1 | 12/2018 | Reguly et al. |
| 10,235,236 B1 | 3/2019 | Whitlock et al. |
| 10,242,200 B1 | 3/2019 | Young |
| 10,264,022 B2 | 4/2019 | DiFalco et al. |
| 10,282,426 B1 | 5/2019 | Lerner et al. |
| 10,291,471 B1 | 5/2019 | Whitlock et al. |
| 2003/0070003 A1* | 4/2003 | Chong ................. G06F 21/577 719/330 |
| 2004/0064735 A1* | 4/2004 | Frazier ................. G06F 21/316 706/16 |
| 2006/0242277 A1 | 10/2006 | Torrence et al. |
| 2007/0043786 A1 | 2/2007 | DiFalco et al. |
| 2007/0124255 A1 | 5/2007 | DiFalco et al. |
| 2007/0192867 A1* | 8/2007 | Miliefsky .............. H04L 63/20 726/25 |
| 2013/0073704 A1 | 3/2013 | Whitlock et al. |
| 2013/0167238 A1* | 6/2013 | Russell ................ G06F 21/577 726/25 |
| 2014/0013434 A1* | 1/2014 | Ranum ................ H04L 63/145 726/24 |
| 2014/0096181 A1 | 4/2014 | Rivers |
| 2015/0256554 A1* | 9/2015 | Sakakibara ............ G06F 11/34 726/25 |
| 2016/0021056 A1* | 1/2016 | Chesla ................. H04L 63/02 726/11 |
| 2016/0044057 A1* | 2/2016 | Chenette ............ H04L 63/1433 726/1 |
| 2016/0065599 A1* | 3/2016 | Hovor .................... G06F 21/55 726/23 |
| 2016/0127408 A1* | 5/2016 | Miu ................... H04L 63/1433 726/25 |
| 2016/0234238 A1* | 8/2016 | Harutyunyan ...... H04L 63/1433 |
| 2016/0261631 A1* | 9/2016 | Vissamsetty ........ H04L 63/1491 |
| 2016/0306981 A1* | 10/2016 | Hoog .................... G06F 21/577 |
| 2016/0366174 A1* | 12/2016 | Chernin ........... H04L 29/06965 |
| 2017/0272323 A1 | 9/2017 | Torrence et al. |
| 2017/0316203 A1* | 11/2017 | Reybok ................ H04L 63/145 |
| 2018/0069756 A1 | 3/2018 | Torrence et al. |
| 2018/0130020 A1 | 5/2018 | Good et al. |
| 2018/0276254 A1 | 9/2018 | Whitlock et al. |

\* cited by examiner

FIG. 19

HISTORICAL EXPLOIT AND VULNERABILITY DETECTION

CROSS REFERENCE TO RELATED APPLICATIONS

This application claims the benefit of U.S. Provisional Application No. 62/199,973 entitled "HISTORICAL EXPLOIT AND VULNERABILITY DETECTION" and filed on Jul. 31, 2015, which is hereby incorporated herein by reference in its entirety.

FIELD

This application relates generally to the field of managing, monitoring, and controlling information technology ("IT") assets in an IT infrastructure in order to improve the functioning of the IT assets and overall IT infrastructure.

SUMMARY

Disclosed below are representative embodiments of methods, apparatus, and systems for improving the functioning of IT assets in an IT infrastructure. The embodiments help secure and protect against outside cybersecurity attacks on IT assets and infrastructures, such as internet-centric attacks.

Particular embodiments comprise detecting exploitable vulnerabilities of IT assets of an IT infrastructure, using the observed vulnerability data together with collected event log data to determine whether a respective vulnerability has actually been exploited for an asset, integrating change audit data and third-party threat data with the vulnerability data for exploited vulnerabilities, generating user interfaces/reports that display selected aspects of the integrated data, and/or modifying the asset to address the exploited vulnerability in response. The embodiments can be implemented at least in part by one or more security control tools, such as one or more of a security configuration management tool, a vulnerability management tool, an event logging tool, or other IT infrastructure security or monitoring tool that is used to monitor, secure, and/or control assets in an IT infrastructure. The security control tools can be part of a suite of tools (provided by a single vendor or, at least partially, by separate vendors) or a single integrated tool with sub-components performing the various respective operations disclosed herein.

In some embodiments, the disclosed technology helps integrate and usefully apply vulnerability and/or threat data obtained from a variety of different security control tools. In particular implementations, the disclosed technology involves collecting vulnerability data (e.g., from a vulnerability scan of one or more nodes in the IT infrastructure), checking logs for evidence of any attack or exploitation of the vulnerability, gathering additional relevant data from a security configuration management ("SCM") tool (also referred to as a compliance and configuration control ("CCC") tool), gathering threat intelligence from third parties (e.g., third-party threat intelligence vendors), and/or generating a report integrating the collected data (e.g., one or more screens presented in a dedicated application or via web site that presents a report (or visualization) concerning the one or more exploited vulnerabilities along with supplemental information associated with the vulnerability obtained from the logs, SCM tool, and/or third-party threat intelligence services). In some instances, the reports are interactive and allow a user to quickly view, filter, and evaluate certain detailed information for a particular vulnerability detected in an enterprise's IT infrastructure.

Certain disclosed embodiments provide for the automated conversion of vulnerability scan data into forensic search strings (e.g., to be applied to a database of an event logging tool). Embodiments of the disclosed technology also implement the automated gathering of forensic data triggered from exploit detection. For example, the gathering of changed files and/or audit log data can be triggered upon exploit detection. Further, the audit log data can be gathered using an elastic time search. Still further, embodiments of the disclosed also enhance the collected forensic data by obtaining information from external, third-party threat intelligence providers.

Some example embodiments disclosed herein concern improving security of networked information technology ("IT") assets in an IT infrastructure and comprise: performing a vulnerability scan for one or more of the networked IT assets; for a detected vulnerability of a respective one of the networked IT assets, determining one or more observables that indicate exploitation of the detected vulnerability; searching a historic event log of the respective one of the networked IT assets for the one or more observables; and determining whether the detected vulnerability was exploited in a past attack at the respective one of the networked IT assets using results of the searching. In some embodiments, upon determining that the detected vulnerability was exploited in a past attack, a tag for the respective one of the networked IT assets is altered in a security configuration management tool to a state indicating that the respective one of the networked IT assets has been exploited. In certain embodiments, upon determining that the detected vulnerability was exploited in a past attack, one or more change audit reports are obtained from a security configuration management tool, the change audit reports including data concerning file changes performed at the respective one of the networked IT assets. For instance, change audit reports can be retrieved from a time frame that encompasses a time of a first set of one or more observables for the detected vulnerability and that is expanded to further encompass a time of a second set of one or more observables for the detected vulnerability. In some embodiments, upon determining that the detected vulnerability was exploited in a past attack, data is obtained from a third-party threat intelligence service indicating one or more of a severity of the past attack or an identity of a source of the past attack. In certain embodiments, the respective one of the networked IT assets is modified to remedy the vulnerability. The searching of the historic event log of the respective one of the networked IT assets for the one or more observables can be an adaptive search (comprising, for example, searching for the one or more observables in a first historic time frame; and, conditional on the one or more observables not being found (or being found) in the first historic time frame, searching for the one or more observables in a second historic time frame earlier than the first historic time frame). The determining the one or more observables that indicate exploitation of the detected vulnerability can comprise: converting a result from the vulnerability scan into a standardized threat information expression including a common vulnerability enumeration (CVE) value; and extracting the one or more observables from a vulnerability database using the standardized threat information expression. For instance, the one or more observables can be specified as a CybOX description characterized by Boolean operators that indicate conditions which, when satisfied, evidence an actual attack through the detected vulnerability. Further, the vulnerability database can be a remote third-party vulnerability database. In some embodiments, an integrated report is displayed that visually indicates data concerning the detected vulnerability. For instance, the integrated report can be interactive and can display one or more of: (a) an IP address of the respective one of the networked IT assets, (b) an attack count value identifying a number of attacks of the detected vulnerability, (c) an attacker count value identifying a number of unique attackers responsible for the attacks, (d) a changed files value identifying a number of changed files observed at the respective one of the networked IT assets as a result of the attacks and as memorialized by an security configuration management tool monitoring the IT assets, (e) a vulnerability count value identifying a number of vulnerabilities observed at the respective one of the networked IT assets upon perform the vulnerability scan, (f) an exploit count value identifying a number of those vulnerabilities that were actually exploited; (g) a vulnerability ID value for the detected vulnerability; (h) a target value indicating an IP address of the asset on which the detected vulnerability was observed; (i) an attacker ID value indicating an IP address of a source of the attack on the detected vulnerability; (j) a time value indicating a date and time of the attack; and/or (k) log data indicating the one or more observables that evidence the attack.

Other example embodiments disclosed herein comprise searching a historic event log of an IT asset for one or more observables, the one or more observables being events or properties that evidence exploitation of a vulnerability at the IT asset; determining that the vulnerability was exploited in one or more past attacks of the IT asset using results of the searching; obtaining one or more change audit reports from a security configuration management tool, the change audit reports including data concerning file changes performed at the IT asset in a bounded time frame encompassing the times of the one or more past attacks; and displaying an integrated report that reports the one or more past attacks of the IT asset together with change data obtained from the change audit reports. The searching the historic event log can be performed by an adaptive process that expands a historic time frame searched conditionally upon not finding evidence of a past attack exploiting the vulnerability of the IT asset in a smaller historic time frame. Some embodiments further comprise obtaining data from a third-party threat intelligence service indicating one or more a severity of the past attacks or an identity of a source of the past attacks. In such instances, the integrated report can include the one or more of the severity of the past attacks or the identity of the source of the past attacks. In certain embodiments, the one or more observables are specified as a CybOX description characterized by Boolean operators that indicate conditions which, when satisfied, evidence an actual attack through the vulnerability.

Other disclosed embodiments include a system comprising: a vulnerability scanner configured to perform a vulnerability scan for one or more of the networked IT assets; and a historical exploit and vulnerability detection tool configured to perform a past attack detection process comprising: for a detected vulnerability of a respective one of the networked IT assets, determining one or more observables that indicate exploitation of the detected vulnerability; searching a historic event log of the respective one of the networked IT assets for the one or more observables; and determining whether the detected vulnerability was exploited in a past attack at the respective one of the networked IT assets using results of the searching. The historical exploit and vulnerability detection tool can be further configured to determine the one or more observables that indicate exploitation of the detected vulnerability by: converting a result from the vulnerability scan into a standardized threat information expression including a common vulnerability enumeration (CVE) value; and extracting the one or more observables from a third-party remote vulnerability database using the standardized threat information expression. Further, the historical exploit and vulnerability detection tool can be further configured to: retrieve additional threat information concerning the exploitation from a third party remote threat intelligence provider. The historical exploit and vulnerability detection tool can also be further configured to display an integrated report visually indicating an IP address of the respective one of the networked IT assets and one or more of: (a) an attack count value identifying a number of attacks of the detected vulnerability, (b) an attacker count value identifying a number of unique attackers responsible for the attacks, (c) a changed files value identifying a number of changed files observed at the respective one of the networked IT assets as a result of the attacks and as memorialized by an security configuration management tool monitoring the IT assets, (d) a vulnerability count value identifying a number of vulnerabilities observed at the respective one of the networked IT assets upon perform the vulnerability scan, (e) an exploit count value identifying a number of those vulnerabilities that were actually exploited, (f) a vulnerability ID value for the detected vulnerability; (g) a target value indicating an IP address of the asset on which the detected vulnerability was observed; (h) an attacker ID value indicating an IP address of a source of the attack on the detected vulnerability; (i) a time value indicating a date and time of the attack; or (j) log data indicating the one or more observables that evidence the attack.

The disclosed methods, apparatus, and systems should not be construed as limiting in any way. Instead, the present disclosure is directed toward all novel and/or nonobvious features and aspects of the various disclosed embodiments, alone or in various combinations and subcombinations with one another.

The foregoing and other objects, features, and advantages of the disclosed technology will become more apparent from the following detailed description, which proceeds with reference to the accompanying figures.

BRIEF DESCRIPTION OF THE FIGURES

FIGS. 14-19 illustrate example screen shots of an interactive integrated report produced in embodiments of the disclosed technology.

DETAILED DESCRIPTION

I. General Considerations

Figure 1:
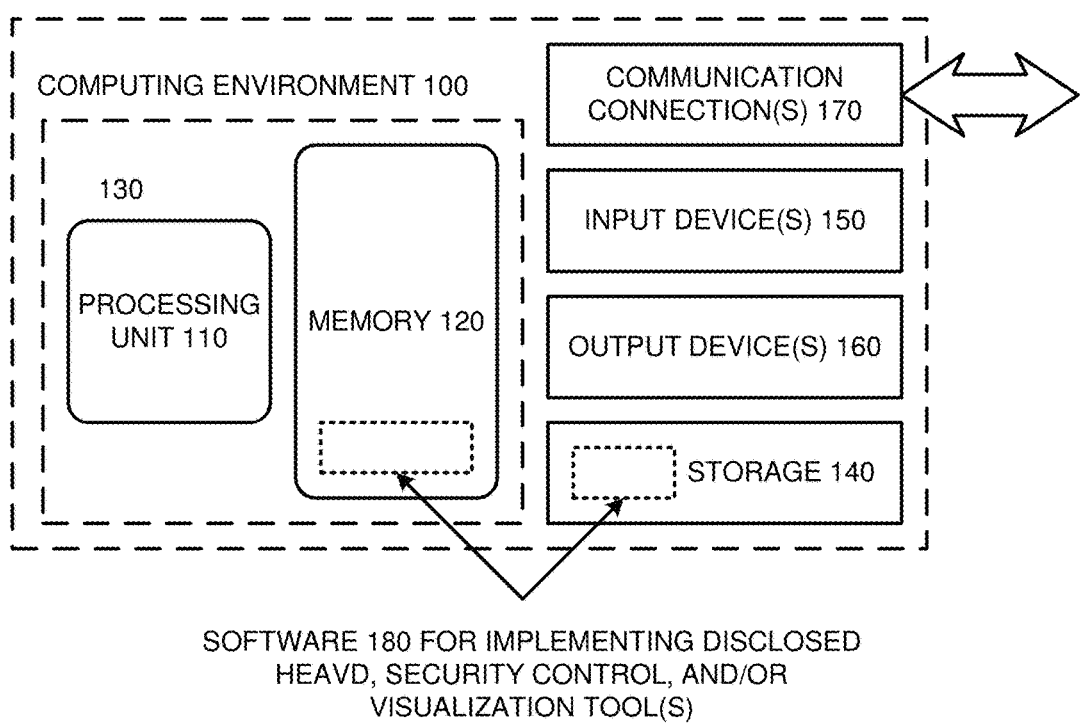
FIG. 1 illustrates a generalized example of suitable computing hardware with which several of the described embodiments can be implemented.

Disclosed below are representative embodiments of methods, apparatus, and systems for detecting, processing, and reporting exploited and exploitable vulnerabilities in an IT infrastructure. The disclosed methods, apparatus, and systems should not be construed as limiting in any way. Instead, the present disclosure is directed toward all novel and nonobvious features and aspects of the various disclosed embodiments, alone and in various combinations and subcombinations with one another. Furthermore, any features or aspects of the disclosed embodiments can be used in various combinations and subcombinations with one another. For example, one or more method acts from one embodiment can be used with one or more method acts from another embodiment and vice versa. The disclosed methods, apparatus, and systems are not limited to any specific aspect or feature or combination thereof, nor do the disclosed embodiments require that any one or more specific advantages be present or problems be solved.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods. Additionally, the description sometimes uses terms like "determine" and "compare" to describe the disclosed methods. These terms may be high-level abstractions of the actual operations that are performed. The actual operations that correspond to these terms may vary depending on the particular implementation and are readily discernible by one of ordinary skill in the art. Further, as used in this application and in the claims, the singular forms "a," "an," and "the" include the plural forms unless the context clearly dictates otherwise. Additionally, the term "includes" means "comprises." Further, as used herein, the term "and/or" means any one item or combination of items in the phrase.

II. Example Computing Environments for Implementing Embodiments of the Disclosed Technology Any of the disclosed methods can be implemented as computer-executable instructions stored on one or more computer-readable media (e.g., non-transitory computer-readable media, such as one or more optical media discs, volatile memory components (such as DRAM or SRAM), or nonvolatile memory components (such as hard drives or NVRAM)) and executed on a computer (e.g., any suitable computer, including desktop computers, servers, smart phones, tablet computers, laptops, netbooks, or other devices that include computing hardware). Any of the computer-executable instructions for implementing the disclosed techniques as well as any data created and used during implementation of the disclosed embodiments can be stored on one or more computer-readable media (e.g., non-transitory computer-readable media). The computer-executable instructions can be part of, for example, a dedicated software application or a software application that is accessed or downloaded via a web browser or other software application (such as a remote computing application). Such software can be executed, for example, on a single local computer or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C++, Java, Perl, JavaScript, Adobe Flash, or any other suitable programming language. Likewise, the disclosed technology is not limited to any particular computer or type of hardware. Certain details of suitable computers and hardware are well known and need not be set forth in detail in this disclosure.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, cable (including fiber optic cable), magnetic communications, electromagnetic communications (including RF, microwave, and infrared communications), electronic communications, or other such communication means.

The disclosed methods can also be implemented by specialized computing hardware that is configured to perform any of the disclosed methods. For example, the disclosed methods can be implemented (entirely or at least in part) by an integrated circuit (e.g., an application specific integrated circuit ("ASIC") or programmable logic device ("PLD"), such as a field programmable gate array ("FPGA")). The integrated circuit can be embedded in or directly coupled to an electrical device having a suitable display device.

FIG. 1 illustrates a generalized example of suitable computing hardware 100 with which several of the described embodiments can be implemented. The computing hardware 100 is not intended to suggest any limitation as to the scope of use or functionality of the disclosed technology, as the techniques and tools described herein can be implemented in diverse general-purpose or special-purpose environments that have computing hardware.

With reference to FIG. 1, the computing hardware 100 includes at least one processing unit 110 and memory 120. In FIG. 1, this most basic configuration 130 is included within a dashed line. The processing unit 110 executes computer-executable instructions. In a multi-processing system, multiple processing units execute computer-executable instructions to increase processing power. The memory 120 may be volatile memory (e.g., registers, cache, RAM), non-volatile memory (e.g., ROM, EEPROM, flash memory, NVRAM), or some combination of the two. The memory 120 stores software 180 for implementing one or more of the described embodiments. For example, the memory 120 can store software 180 for implementing any of the disclosed techniques described herein and their accompanying user interfaces.

The computing environment can have additional features. For example, the computing hardware 100 includes storage 140, one or more input devices 150, one or more output devices 160, and one or more communication connections 170. An interconnection mechanism (not shown) such as a bus, controller, or network interconnects the components of the computing environment 100. Typically, operating system software (not shown) provides an operating environment for other software executing in the computing environment 100, and coordinates activities of the components of the computing environment 100.

The storage 140 can be removable or non-removable, and includes magnetic disks, magnetic tapes or cassettes, CD-ROMs, DVDs, or any other such tangible non-transitory non-volatile memory or storage medium which can be used to store information and which can be accessed within the computing environment 100. The storage 140 can also store instructions for the software 180 implementing any of the described techniques, systems, or environments.

The input device(s) 150 can be a touch input device such as a keyboard, touchscreen, mouse, pen, trackball, a voice input device, a scanning device, or another device that provides input to the computing environment 100. The output device(s) 160 can be a display device (e.g., a computer monitor, smartphone display, tablet display, laptop display, netbook display, or touchscreen), printer, speaker, CD-writer, or another device that provides output from the computing environment 100. Any of the disclosed user interfaces can be displayed on such display devices as part of an implementation of the disclosed technology.

The communication connection(s) 170 enable communication over a communication medium to another computing entity. The communication medium conveys information such as computer-executable instructions or other data in a modulated data signal. A modulated data signal is a signal that has one or more of its characteristics set or changed in such a manner as to encode information in the signal. By way of example, and not limitation, communication media include wired or wireless techniques implemented with an electrical, optical, RF, infrared, acoustic, or other carrier.

As noted, the various methods can be described in the general context of computer-readable instructions stored on one or more computer-readable media. Computer-readable media are any available media that can be accessed within or by a computing environment. By way of example, and not limitation, with the computing environment 100, computer-readable media include tangible non-transitory computer-readable media such as memory 120 and storage 140 but do not encompass transitory signals or carrier waves per se.

The various methods disclosed herein can also be described in the general context of computer-executable instructions, such as those included in program modules, being executed in a computing environment by a processor. Generally, program modules include routines, programs, libraries, objects, classes, components, data structures, and so on that perform particular tasks or implement particular abstract data types. The functionality of the program modules may be combined or split between program modules as desired in various embodiments. Computer-executable instructions for program modules may be executed within a local or distributed computing environment.

Figure 2:
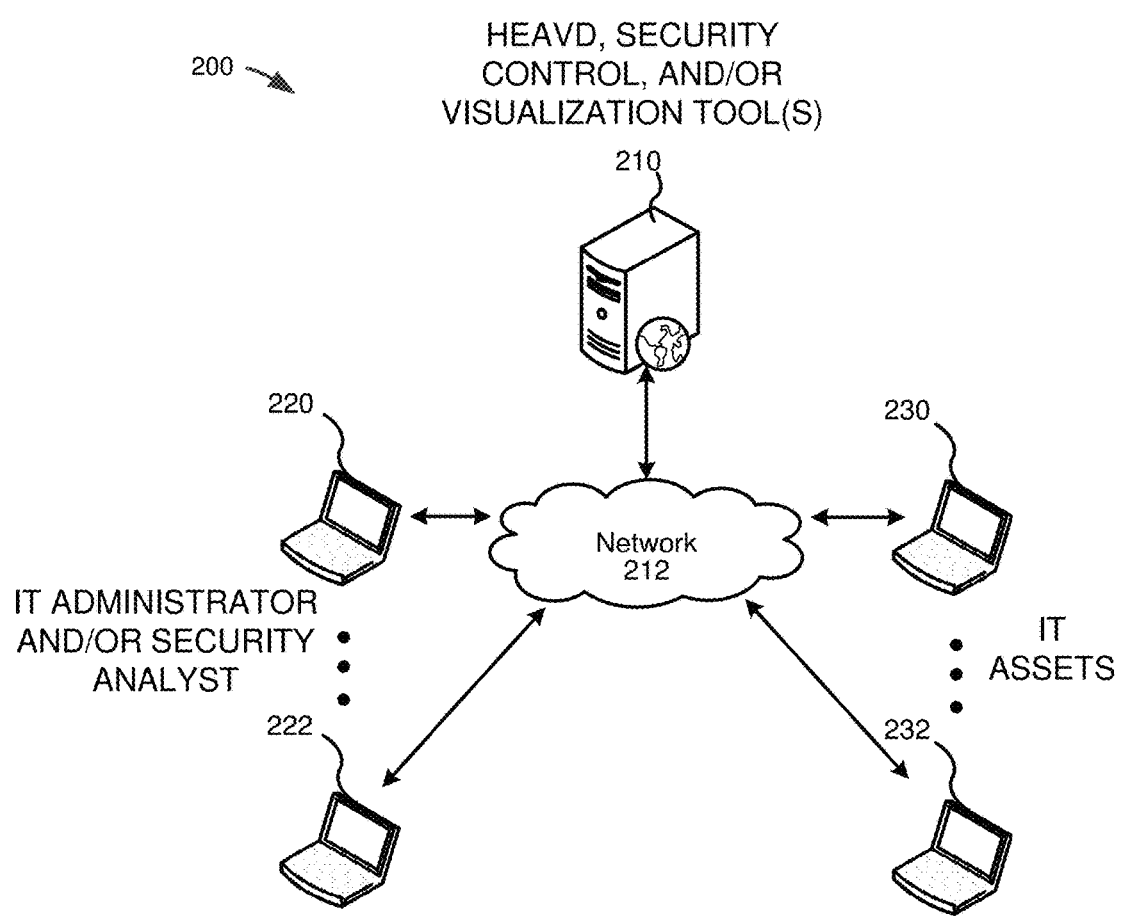
FIGS. 2 and 3 illustrate example network topologies for implementing a system according to the disclosed technology.

An example of a possible network topology 200 (e.g., a client-server network or cloud-based network) for implementing a system according to the disclosed technology is depicted in FIG. 2. Networked computing devices 220, 222, 230, 232 can be, for example, computers running a browser, plug-in, or other software that communicates with one or more central computers 210 (e.g., one or more servers in a cloud computing environment) via network 212. The computing devices 220, 222, 230, 232 and the central computer 210 can have computer architectures as shown in FIG. 1 and discussed above. The computing devices 220, 222, 230, 232 are not limited to traditional personal computers (e.g., desktop or laptop computers) but can comprise other computing hardware configured to connect to and communicate with a network 212 (e.g., smart phones, tablets, or other mobile computing devices, servers, network devices, routers, dedicated devices, and the like).

In the illustrated embodiment, the computing devices 220, 222, 230, 232 are configured to communicate with one or more central computers 210 via a network 212 (e.g., using a cloud network or other client-server network). In certain implementations, the central computers 210 execute software for performing any of the disclosed security control and/or visualization functionalities (e.g., any one or more of the tools and/or techniques described below in FIGS. 5-19) or software for computing any one or more of the intermediate or final values associated with the disclosed embodiments. The central computers 210 can transmit data to any of the computing devices 220, 222 (e.g., data for any of the integrated reports shows in FIGS. 14-19 or any other data to be processed or displayed on a graphical user interface or web page at the computing devices 220, 222). For example, the computing devices 220, 222 (e.g., computing devices associated with an IT administrator, security analyst, or Chief Information Security Officer (CISO)) can receive data from the central computer 210 over the network 212. In order to provide the data, the one or more central computers 210 can receive and process data from the computing devices 230, 232 (e.g., computing devices or other devices associated with assets or nodes in the IT infrastructure administered by the IT administrator, security analyst, or CISO), which can store and/or transmit various types of configuration data, event log data, vulnerability scan data, and/or other such security data used by the security control tools of the IT infrastructure. For example, the computing devices 230, 232 may store device configuration data, compliance policy data, change data, security data, logging event data, vulnerability assessment data, and/or other such data used by a security configuration management tool, event logging tool, and/or vulnerability scanning tool. In some embodiments, this data is collected and managed by one or more respective software agents installed on the computing devices 230, 232 and controlled respectively by the by a respective security configuration management tool, event logging tool, and/or vulnerability scanning tool. Alternatively, the one or more central computers 210 may themselves store the device configuration data, compliance policy, security, logging event, vulnerability assessment, and other such IT data. In this case, the data may still be collected and transmitted to the central computers 210 via one or more respective software agents installed on the computing devices 230, 232.

Figure 3:
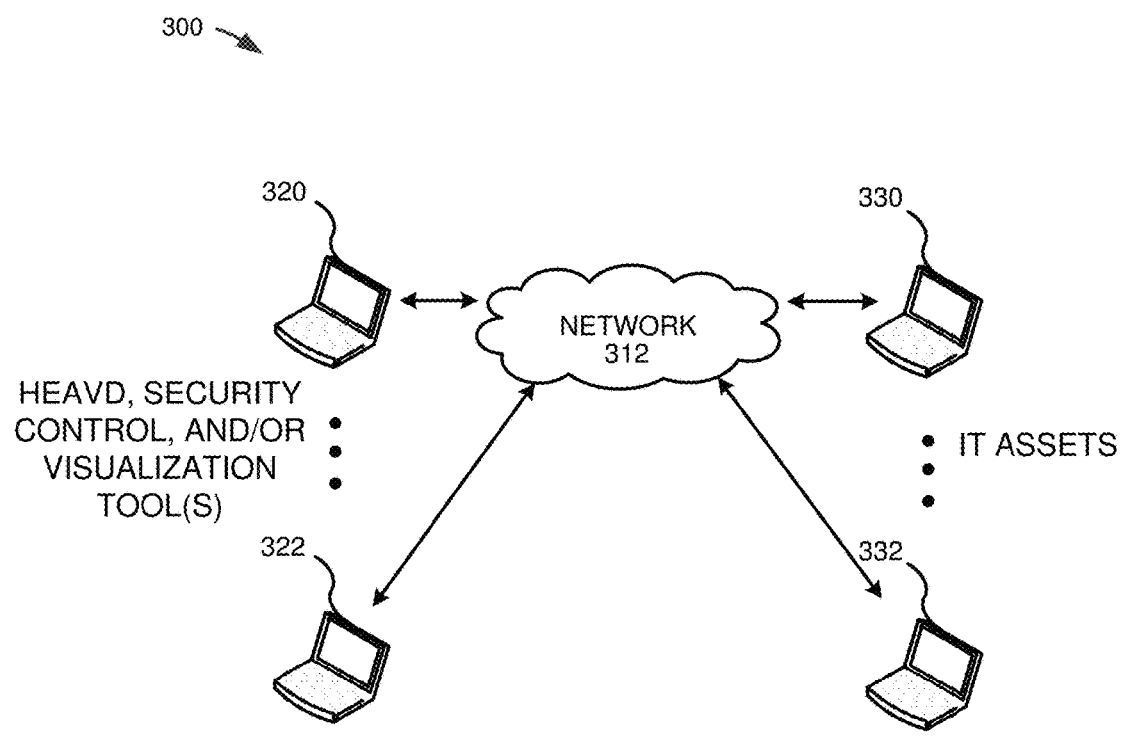

Another example of a possible network topology 300 for implementing a system according to the disclosed technology is depicted in FIG. 3. Networked computing devices 320, 322, 330, 332 can be, for example, computers running a browser or other software connected to a network 312. As above, the computing devices 320, 322, 330, 332 can have computer architectures as shown in FIG. 1 and discussed above. The computing devices 320, 322, 330, 332 are not limited to traditional personal computers (e.g., desktop or laptop computers) but can comprise other computing hardware configured to connect to and communicate with a network 312 (e.g., smart phones, tablets, or other mobile computing devices, servers, network devices, dedicated devices, and the like).

In the illustrated embodiment, the computing devices 320, 322 (e.g., computing devices or other devices associated with assets or nodes in the IT infrastructure administered by the IT administrator, security analyst, or CISO) are configured to communicate directly with computing devices 330, 332 (e.g., computing devices associated with an IT administrator, security analyst, or Chief Information Security Officer (CISO)) via the network 312. In the illustrated embodiment, the computing devices 320, 322 execute software for implementing any of the disclosed security control and/or visualization functionalities (e.g., historical vulnerability detection functionalities, data integration functionalities, and/or display functionalities) or software for computing any one or more of the intermediate or final values associated with the disclosed embodiments. The computing devices 320, 322 can use data obtained from the computing devices 330, 332 via the network 312. Any of the data received from the devices 330, 332, can be stored or displayed on any of the computing devices 320, 322 (e.g., displayed as data on a graphical user interface or web page at the computing devices 320, 322).

In the illustrated embodiments, the illustrated networks 212, 312 can be implemented as a Local Area Network ("LAN") using wired networking (e.g., the Ethernet IEEE standard 802.3 or other appropriate standard) or wireless networking (e.g. one of the IEEE standards 802.11a, 802.11b, 802.11g, or 802.11n or other appropriate standard). Alternatively, at least part of the networks 212, 312 can be the Internet or a similar public network and operate using an appropriate protocol (e.g., the HTTP protocol).

III. Example Embodiments of the Disclosed Technology

Disclosed herein are representative embodiments of methods, apparatus, and systems for detecting exploitable vulnerabilities in IT assets of an IT infrastructure, using the observed vulnerability data together with collected event log data to determine whether a respective vulnerability has actually been exploited at an asset, integrating change audit data and third-party threat data with the vulnerability data for exploited vulnerabilities, generating user interfaces/reports that display selected aspects of the integrated data, and/or modifying the asset to address the exploited vulnerability in response. The embodiments can be implemented at least in part by one or more of security control tools, such as one or more of a security configuration management tool (e.g., sometimes referred to as a compliance and configuration control ("CCC") tool), a vulnerability management tool, an event logging tool, or other IT infrastructure security or monitoring tool that is used to monitor, secure, and/or control IT assets in an IT infrastructure. Further, in particular embodiments discussed below, one or more interactive user interfaces are provided for computing and displaying information related to the security and status of one or more vulnerabilities observed at one or more respective IT assets in the IT infrastructure.

The disclosed technology can be used as part of (or in connection with) an IT management infrastructure for managing, monitoring, and controlling one or more IT assets. In this disclosure, assets are also referred to as "nodes" or "devices". The IT nodes (assets or devices) can comprise, for example, servers, desktops, directory servers, hypervisors, databases, middleware applications, network devices, and/or other such assets. In particular embodiments, the IT management infrastructure comprises one or more security control tools, including one or more of a security configuration management tool, a vulnerability management tool, or an event logging tool (which can be implemented separately from one another, as part of a single management platform, or any combination thereof).

In general, a security configuration management ("SCM") tool is used to detect, analyze, and report on change activity in an IT infrastructure. For example, the SCM tool can assess or receive configurations of the one or more nodes at one or more locations and detect and report changes to the configurations. Further, as part of its secure configuration monitoring functionality (also referred to as just configuration monitoring) and for one or more of the monitored nodes, the SCM tool can compare an expected configuration value for a node to a stored security policy. For example, the SCM tool can determine whether the nodes comply with internal and/or external policies (e.g., government, regulatory, or third-party standards, such as Sarbanes-Oxley, HIPAA, ISO 27001, NIST 800, NERC, PCI, PCI-DSS, Basel II, Bill 198, CIS, DISA, FDCC, FFIEC, GCSx, GLBA, GPG 13, IBTRM, or other IT infrastructure compliance standards). The SCM tool can identify and validate changes to ensure these configurations remain in known and trusted states.

In particular implementations, the SCM tool also performs a change auditing functionality in which configuration and/or file changes from a previously stored baseline are detected (e.g., by detecting changes to the hashes of monitored files, configurations, or other data). For example, the SCM tool can discover and profile assets (e.g., via a software agent installed on each respective asset), then capture (e.g., via the software agent) a baseline of server file systems, desktop file system, directory servers, databases, virtual systems, middleware applications and/or network device configurations in a known good state. Ongoing integrity checks then compare the current states against these baselines to detect changes (including detection of any new files, configurations, or monitored data). The SCM tool collects information used to reconcile detected changes, ensuring they are authorized and intended changes. The SCM tool can crosscheck detected changes with defined IT compliance policies (e.g., using policy-based filtering), with documented change tickets in a change control management ("CCM") system, with a list of approved changes, with automatically generated lists created by patch management and software provisioning tools, and/or against other desired and approved changes. This allows the SCM tool to automatically recognize desired changes and expose undesired changes. These detection and cross-checking functions are part of the SCM tool's security configuration monitoring function. As noted, the baseline state and current states can be represented as hashes that provide unique signatures for the files and/or configuration data of the asset.

The SCM tool can also generate one or more reports concerning the monitored nodes showing a wide variety of information (e.g., compliance information, configuration information, usage information, etc.) The compliance-related reports generated by the SCM tool can, in some instances, comprise a score for a node that indicates the relative compliance status of the node as a numerical value in a range of possible values. The SCM tool can also apply a set of one or more tests to the nodes to evaluate the compliance status of one or more nodes. In such embodiments, the compliance-related reports generated by the SCM tool can include the number of devices that passed a particular test as well as the number of devices that failed the test. Still further, the SCM tool can be configured to provide an audit reporting function in which an audit trail of configuration control activities is maintained for one or more selected assets, thereby simplifying any requirement to prove compliance. Further, the auditing can be performed at frequent intervals (e.g., daily or multiple times in a day, which is sometimes referred to herein as "real time") for the selected assets.

An exemplary SCM tool that is suitable for use as a security configuration management tool with the disclosed technology is the Tripwire® Enterprise tool available from Tripwire, Inc. The examples described below are sometimes shown or discussed as being used in connection with the Tripwire Enterprise tool. This particular usage should not be construed as limiting, however, as the disclosed technology can be adapted by those skilled in the art to help monitor and manage IT nodes using other compliance and configuration control tools as well.

As noted, the SCM tool may be used with one or more other software tools (e.g., as part of a bigger asset management platform), such as an event logging tool and/or a vulnerability management tool to perform embodiments of the disclosed technology. One such platform having multiple software tools that is suitable for use with or adaptation to implement embodiments of the disclosed technology is the Tripwire® VIA platform.

An event logging tool can be used to monitor and store detected event data in an event log and/or transmit the event data as soon as it is detected or shortly after it is detected. The event detection, storage, and/or transmission to another tool can be facilitated, at least in part, via a dedicated software agent for the event logging tool installed at a respective IT asset. Event logs typically comprise a list of activities and configuration changes at nodes of the IT network.

One such event logging and management tool that is suitable for use with or adaptation to implement embodiments of the disclosed technology is the Tripwire® Log Center tool available from Tripwire, Inc. This particular usage should not be construed as limiting, however, as the disclosed technology can be used with other event logging tools for an IT environment.

A vulnerability management tool (also referred to as a vulnerability scanning tool) is typically configured to detect (via a vulnerablity scanning operation), analyze, and report on one or more security control issues for one or more of the assets. The vulnerability scanning, analysis, and/or reporting functions can be facilitated, at least in part, via a dedicated software agent for the vulnerability management tool installed at a respective IT asset. Or, in some embodiments, the scanning, analysis, and/or reporting functions are performed in an agentless manner. Further, the vulnerability management tool can measure and help manage security risks to the assets. The vulnerability management tool can itself perform an operation whereby networked assets are discovered and profiled (via its software agent and separate from the SCM tool). For instance, the vulnerability management tool can profile networked hosts, applications, services, vulnerabilities, and configurations in order to provide a risk management view of the assets separate from the SCM tool. The vulnerability management tool can also be configured to perform vulnerability scanning operations on internal networks and/or vulnerability scanning on outward-facing networks, such as scanning for web application vulnerabilities.

Example vulnerability management tools that are suitable for use with or adaptation to implement embodiments of the disclosed technology are the Tripwire® IP360 or Tripwire® WebApp360 vulnerability management tools available from Tripwire, Inc. The examples described below are sometimes shown as being used in connection with the Tripwire IP360 tool. This particular usage should not be construed as limiting, however, as the disclosed technology can be used with other vulnerability management tools for an IT environment.

Each of these example security control tools can provide one or more functions related to the security control of assets in an IT environment. Accordingly, such functions are sometimes referred to as "security controls". Further, it should be understood that a given security control tool may provide one or multiple security controls for one or more assets in the IT infrastructure. For example, the SCM tool can provide a configuration monitoring security control (as discussed above) as well as a change auditing security control (also discussed above), while the vulnerability management tool can provide a vulnerability assessment security control (as discussed), and the event logging tool can provide an event logging security control (as also discussed above).

Embodiments of the disclosed technology concern a historical exploit and vulnerability detection ("HEAVD") tool that is configured to access and receive data from one or more of the security control tools introduced above (e.g., from one or more of a security configuration management tool, vulnerability management tool, event logging tool, or other IT infrastructure security or monitoring tool). More specifically, and in particular embodiments, the HEAVD tool is configured to collect/input data from the vulnerability management tool; convert vulnerability data to a search string/query for use with the logs of the event logging tool; with data obtained from the logs of the event logging tool, determine whether a respective vulnerability has actually been exploited at an asset; integrate change audit data from the database of the security configuration management tool and/or threat data from third-party sources with the vulnerability data for vulnerabilities determined to have been exploited; and/or generate user interfaces/reports that display (e.g., in an interactive manner) selected aspects of the integrated data. The user interfaces/reports (examples of which are presented below) provides the user (e.g., a security analyst) with information regarding the exploited vulnerability, the overall threat level of the vulnerability, and/or the asset on which the vulnerability was exploited. For instance, the displayed graphic user interfaces that display information collected from the multiple individual security control tools and/or third-party sources can aggregate and present relevant data in a single interface, thereby allowing the user to ascertain from a single interface information that would otherwise require separate access and report viewing from the individual tools and/or third-party sources.

The efficient collection and integration of data through the use of the HEAVD tool and in accordance with embodiments of the disclosed technology reduces the computational resources and memory usage that would otherwise be needed to collect and view such information. Additionally, by automatically integrated data from across multiple sources using embodiments of the HEAVD tool, the overall computational efficiency of the security control management tools monitoring/controlling an IT infrastructure is improved and processing time reduced when compared to alternate approaches in which the various security control tools remain disassociated and not integrated.

Further, because the data from each of the tools may be voluminous and contain additional information that is not necessary for the user to understand the current security state of the IT assets in his or her enterprise, certain graphic user interfaces disclosed herein display information from the various tools in a highly focused, yet dynamic and flexible, manner. Such interfaces can be important to an organization's IT professionals, including, for example, the organization's security analyst, who is desirably informed of important or critical security issues or changes to the security state as quickly and effectively as possible, regardless of what security control is responsible is responsible for detecting such issues or changes.

In response to any of the generated data and/or reports, one or more of the assets experiencing exploited vulnerabilities can be modified to address and fix the vulnerability, thereby increasing the security of the asset as well as the overall security of the IT infrastructure. For example, the vulnerabilities can be patched through appropriate software updates that alter the overall configuration state of an asset with an exploited vulnerability. This modification to the state of the exploited asset can be automatically performed (e.g., using the SCM tool or other software tool) or, in some cases, performed directly by an IT administrator.

Figure 4:
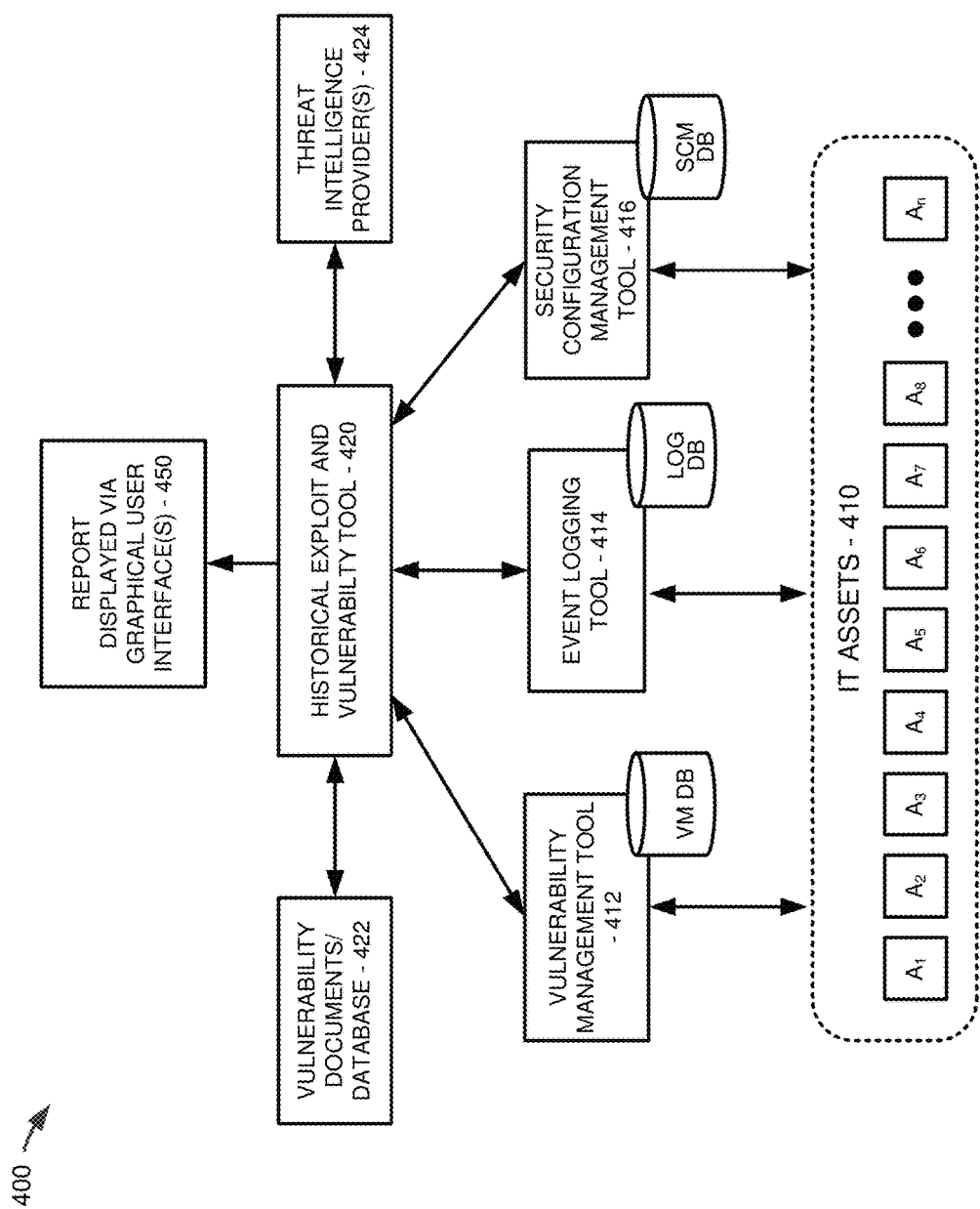
FIG. 4 is a schematic block diagram illustrating an example infrastructure in which embodiments of the disclosed historical exploit and vulnerability detection tool can operate.

FIG. 4 is a schematic block diagram 400 illustrating an example infrastructure in which embodiments of the HEAVD tool operate. In FIG. 4, a HEAVD tool 420 is illustrated operating in conjunction with a vulnerability management tool 412, event logging tool 414, and SCM tool 416. In the illustrated embodiment, and as more fully discussed above, the vulnerability management tool 412, event logging tool 414, and SCM tool 416 are configured respectively to perform vulnerability scans for, collect events for, and perform change auditing for a set of IT assets 410. The results of these activities can be stored in respective databases for each of the tools 412, 414, 416 illustrated as "VS DB", "Log DB", and "SCM DB", respectively).

As more fully explained below, and in accordance with one example embodiment of the disclosed technology, a vulnerability scan is performed by the vulnerability management tool 412. The vulnerability management tool 412 scans the assets 410 looking for vulnerabilities. The results of the scan are input by the HEAVD tool 420 (e.g., in a format specific to the vulnerability management tool 412).

The vulnerability data obtained from the vulnerability management tool 412 can then be converted into a format suitable for use in querying the logs from the event logging tool 414 to determine if the particular observed vulnerability has actually been exploited by an outside threat. This conversion process can comprise a multi-stage conversion, which first converts the results from the vulnerability management tool 412 into a standardized format that is supported by organizations that provide additional information regarding certain observed vulnerabilities. For example, the results from the vulnerability scanning tool 412 can be converted into the structured threat information expression ("STIX") language. By converting into the STIX language, the HEAVD tool 420 can then access and retrieve additional vulnerability information regarding the observed vulnerability from a vulnerability document 422 (or, in some embodiments, a vulnerability database) that is stored in the STIX format. The vulnerability document 422 can be updated and maintained by the provider of the HEAVD tool (e.g., by security analysts associated with the provider of the HEAVD tool who update and maintain the vulnerability document/database) and/or can be updated and maintained by a remote third-party organization or service. From the STIX vulnerability information, the HEAVD tool 420 can search for observables of the threat, which are specified and incorporated into the STIX document using the CybOX language. In a second stage of the multi-stage conversion, the observables (e.g., the CybOX observables) obtained from the STIX conversion can then be used to formulate a search string for the log database of the event logging tool 414 (e.g., in a format adapted for use with the event logging tool 414). The search string can then be applied to the historical event data for an asset on which the vulnerability was observed as maintained in the log database of the event logging tool 414. This log data is typically voluminous and difficult to meaningfully apply without a particular observable being targeted. Thus, the integration of the results from the vulnerability scanning tool 412 with the event logging tool 414 represents a significant advantage in quickly isolating and detecting vulnerabilities that have actually been exploited in an IT infrastructure. Further, by looking backwards into the log data, the IT administrator for the IT infrastructure is informed of vulnerabilities that have already been exploited and can focus on assessing the impact of those exploitations and modifying the asset on which the vulnerability was exploited in order to remedy the asset, rather than only operating with a forward-looking-only security strategy. In particular embodiments of the disclosed technology, if a vulnerability has already been exploited (as evidenced, for example, by finding the CybOX observables for a detected vulnerability in the log data of the event management tool 414), the HEAVD tool 420 can assemble additional information related to the asset on which the vulnerability was observed from the security control management tool 416 as well as additional information about the severity (among other things) of the entity who exploited the vulnerability from one or more threat intelligence providers 424 (e.g., third-party threat intelligence providers). This assembled information can then be integrated into a user-guided report that can be displayed (e.g., to an IT administrator) on a display device via a graphical user interface report 450 (e.g., via web-based interface or dedicated application). Examples of such user interfaces are presented in more detail below and constitute a unique mechanism that provides a visualization of data gathered from a variety of disparate and otherwise disconnected sources in a single interface. The user interface 450 not only significantly improves an IT administrator's ability to evaluate and, as appropriate, respond to exploited vulnerabilities, but also conserves computational and memory resources in the security systems of the IT infrastructure by isolating and assembling relevant data in a single report, thus avoiding separate reports having to be generated from each individual tool or source and further avoiding the generation and display of reports that contain vast amounts of irrelevant information not directly related to the observed vulnerabilities.

Figure 5:
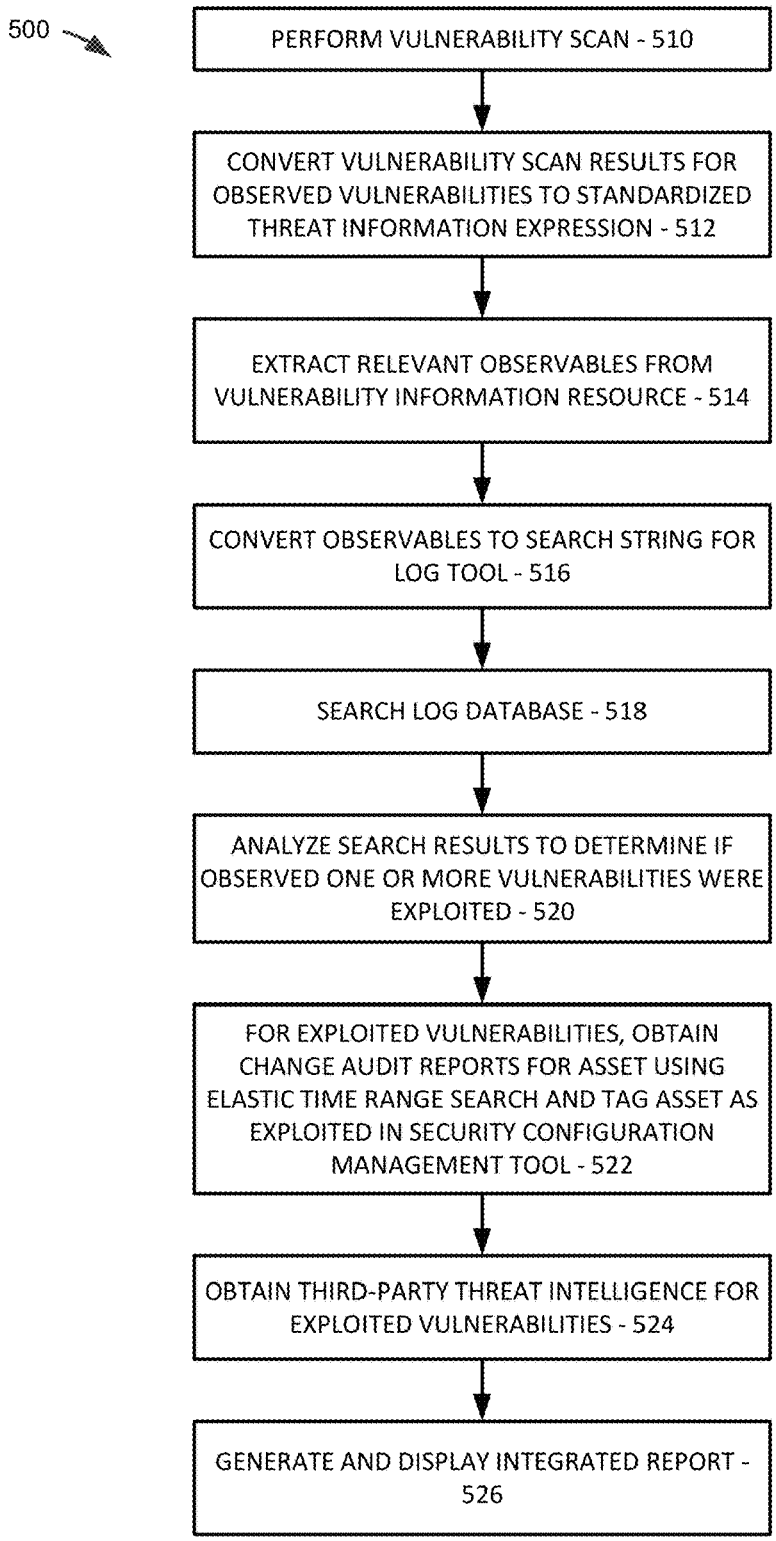
FIG. 5 is a flow chart showing an example embodiment of the disclosed technology (e.g., as can be used in conjunction with one or more of the components illustrated in FIG. 4).

FIG. 5 is a flow chart 500 showing an example embodiment of the disclosed technology (e.g., as can be used in conjunction with one or more of the components illustrated in FIG. 4). The particular embodiment should not be construed as limiting, as the disclosed method acts can be performed alone, in different orders, or at least partially simultaneously with one another. Further, any of the disclosed methods or method acts can be performed with any other methods or method acts disclosed herein.

At 510, a vulnerability scan is performed. The vulnerability scan can be performed, for example, by a suitable vulnerability management tool 412 configured to scan assets in an IT infrastructure. Examples of a suitable vulnerability management tool include Tripwire® IP360 or Tripwire® WebApp360 vulnerability management tools available from Tripwire, Inc. Further details of example vulnerability scanning techniques that can be used are also described in U.S. patent application Ser. No. 14/165,410 filed on Jan. 27, 2014, and entitled "DYNAMIC VULNERABILITY CORRELATION," which is hereby incorporated herein by reference in its entirety.

At 512, one or more results for one or more observed vulnerabilities from the vulnerability scanning tool are converted into a standardized threat information expression. For example, and as noted above, an observed vulnerability from the vulnerability scan can be converted into a STIX format (e.g., as promulgated by MITRE). The observed vulnerability can be, for example, originally generated in the format for Tripwire® IP360 or other vulnerability management tool. The data can include, for example, a hostname, an IP address (e.g., of the asset on which the vulnerability was observed), and/or one or more identifications of the vulnerabilities observed. This data may be common between the two formats and simply need to be reformatted into the proper syntax of the format (e.g., as in the case of the hostname and IP address), but in some cases the data may itself undergo a conversion process. For instance, the vulnerability identifications can be vulnerability-management-tool-unique IDs. In such cases, during the conversion process, the identifications can be mapped to a common vulnerability enumeration (CVE) value that is an industry recognized identification of the observed vulnerability (e.g., a five digit number). Additional information can also be converted from the vulnerability scanning tool format to the STIX format. This conversion can be performed, for example, automatically using a cross-reference database that stores relevant conversion information. Or, in some cases, the conversion can be performed manually for an observed vulnerability.

Figure 6:
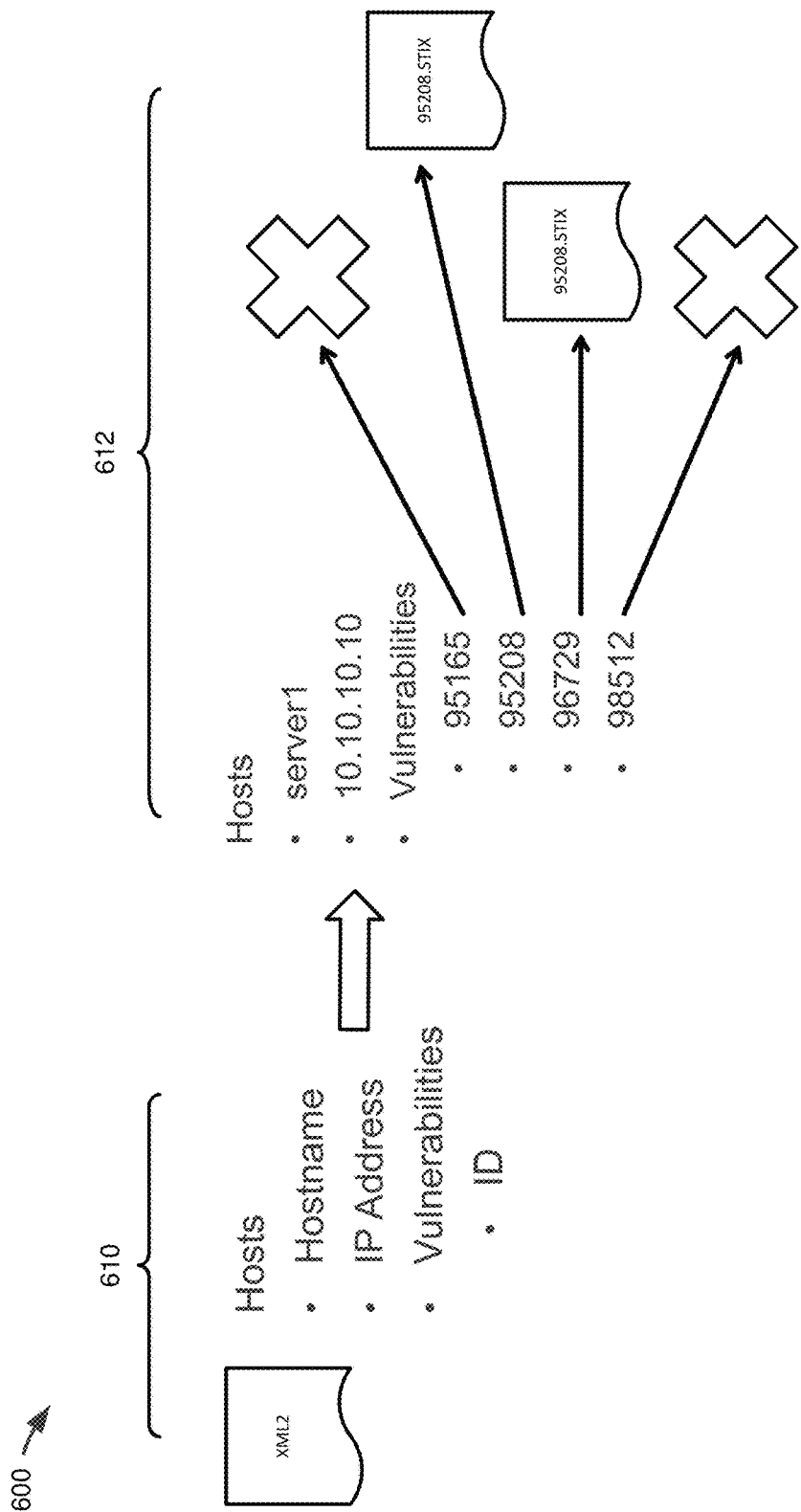
FIG. 6 is a schematic block diagram showing an example conversion process.

FIG. 6 is a schematic block diagram 600 illustrating this conversion process. For example, in FIG. 6, a vulnerability management tool format 610 (e.g., illustrated as an XML2 file) is converted into a standardized format 612 (e.g., a STIX format). In FIG. 6, the "X"s represent situations where a STIX document was not found for that vulnerability ID. More specifically, the figure shows that STIX documents are matched and used for ID's 95208 and 96729, but not for 95165 or 98512.

At 514, relevant observables are extracted from a vulnerability information resource, such as a vulnerability database based on the STIX language. For example, the converted STIX format expression can be used to access and retrieve additional information from a database storing vulnerability information in the STIX format. Such additional information can include, for instance, one or more observables (e.g., events or stateful properties that occur, or may occur, in the operational cyber domain (such as the value of a registry key, deletion of a file, or the receipt of an http GET) in the course of a vulnerability being exploited). These observables serve, for example, as the evidence of a vulnerability being exploited, and thus are useful items for which to search in the event log of an asset for which a vulnerability has been detected.

Figure 7:
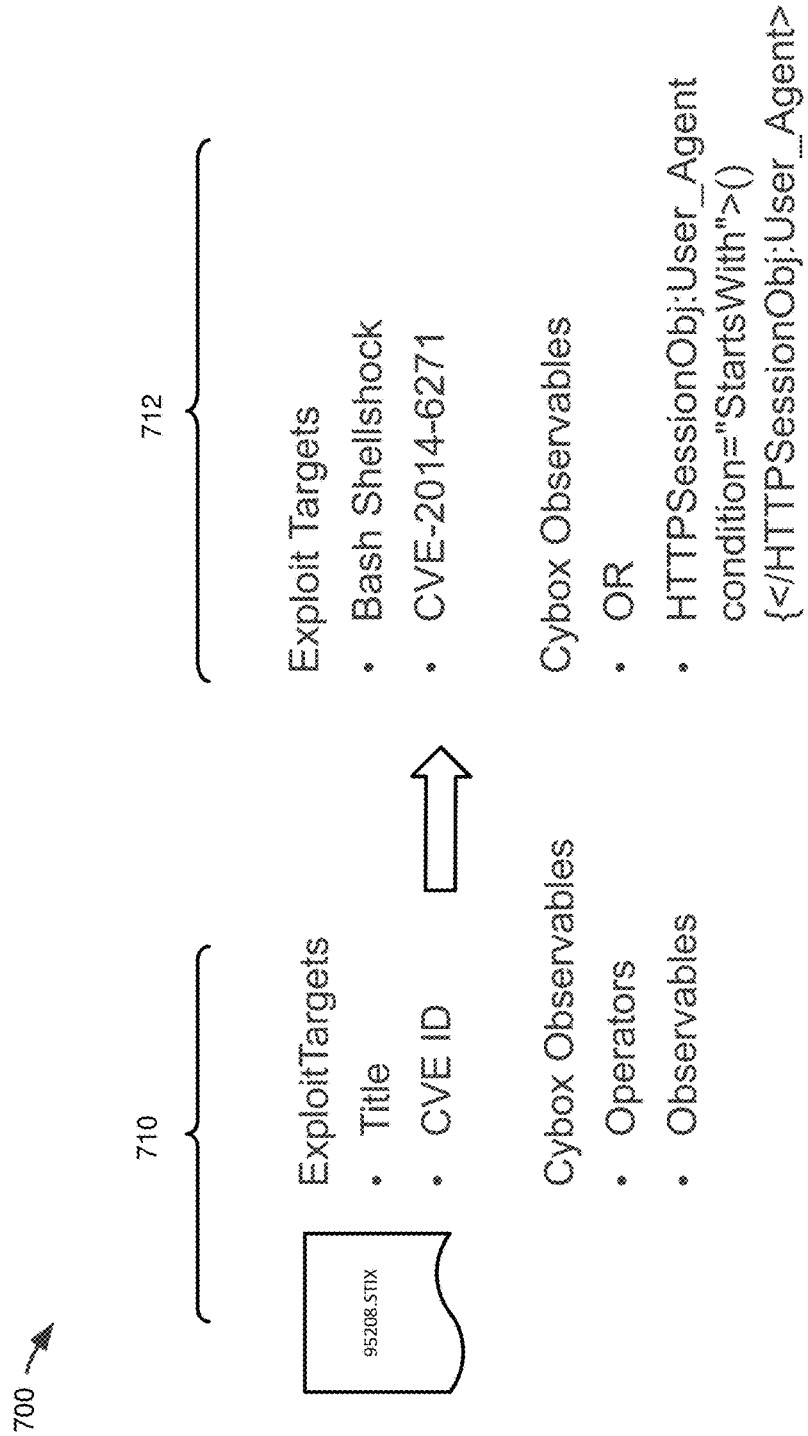
FIG. 7 is a schematic block diagram of relevant observables being pulled from (parsed from) a converted STIX description (document) for a particular observed vulnerability.

FIG. 7 is a schematic block diagram 700 of relevant observables being pulled from (parsed from) the converted STIX description (document) for a particular observed vulnerability. As shown at 710, the STIX document can include, for example, a title of the vulnerability (or exploit target), a CVE ID, and/or a CybOX observable that is characterized by one or more operators (e.g., Boolean operators) defining how the observables are to be considered in order to determine the actual exploitation of the vulnerability and further characterized by the content of the observable itself. An example set of resulting data 712 is also illustrated in FIG. 7. In the illustrated example, the data obtained is for the "Bash Shellshock" vulnerability and includes data for how to detect the exploitation of the vulnerability in terms of a CybOX observable.

Figure 8:
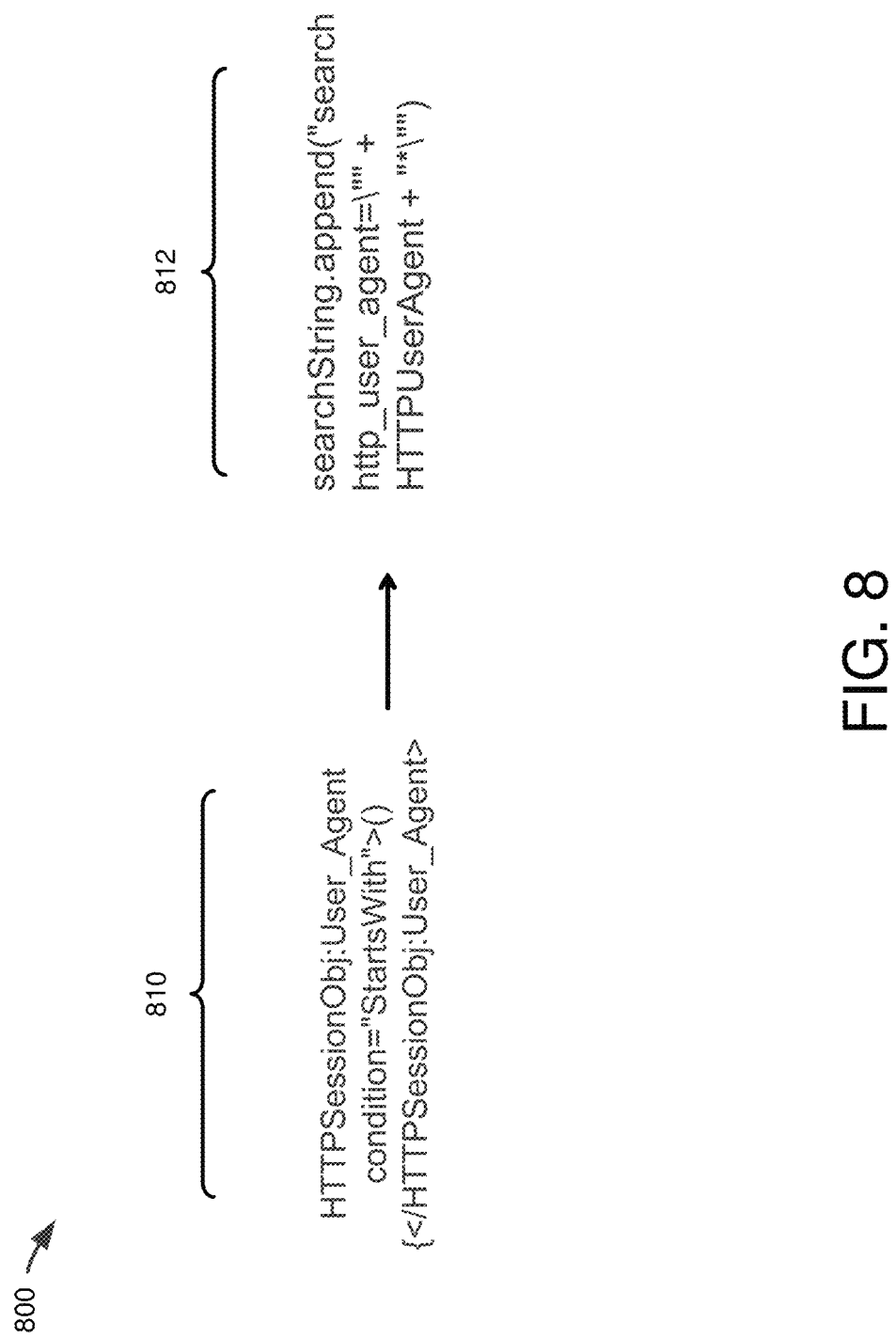
FIG. 8 is a schematic block diagram showing an example of an observable for a detected vulnerability, and a converted version of the observable adapted for use with an event logging tool.

At 516, the observables are converted into a search string for use with an event logging tool. This conversion step may produce a search string that is logging tool specific. FIG. 8 is a schematic block diagram 800 showing an example of an observable 810 for a detected vulnerability, and a converted version 812 of the observable adapted for use with an event logging tool. In particular, 812 is pseudocode representing the conversion of observable data into search string data. The converted version 812 includes variables names in the search string which, as illustrated at 910, can be populated with event-logging-tool specific structures, syntax, and/or data. This conversion can be performed, for example, automatically using a cross-reference database that stores relevant conversion information. Or, in some cases, the conversion can be performed manually for an observed vulnerability.

At 518, the search string is used to search the event log database of the logging tool. In particular embodiments, the search string is particular to the logging tool. For instance, the search string can be adapted for use with an event logging tool such as Log Center from Tripwire Inc., Splunk, Logstash, LogLogic, LogRhythm, or other such event logging tool. In general, the logging event tool monitors network for one or more monitored assets and records the outgoing and/or incoming events (e.g., for a period of time). Further, the event log searched can be a historic event log, and can have a variety of historic time frames that are searched depending on the implementation. For example, in certain embodiments, the search of the historic event log reaches from a current time frame to the last n days, where n is any integer. In other embodiments, other historical time frames are used (e.g., the past n minutes, n days, n years, or any fraction thereof). Still further, the search can be adaptive and depend, at least in part, on results from a search in an initial time frame. For example, an initial search can be performed for a selected time frame (e.g., the past 6 months or other initial time frame); if results are not found during the selected time frame (or, in some embodiments, if results are found), the search can be expanded to include previous time frames (e.g., a further past 6 months or other further past time frame). This search can be repeated until no results are found in the time period searched and/or the time period reaches some limit (e.g., the time period encompasses all available log data). In general, this historical search helps answer the question of whether the vulnerability was ever the subject of a past attack and further creates evidence of attack.

Figure 9:
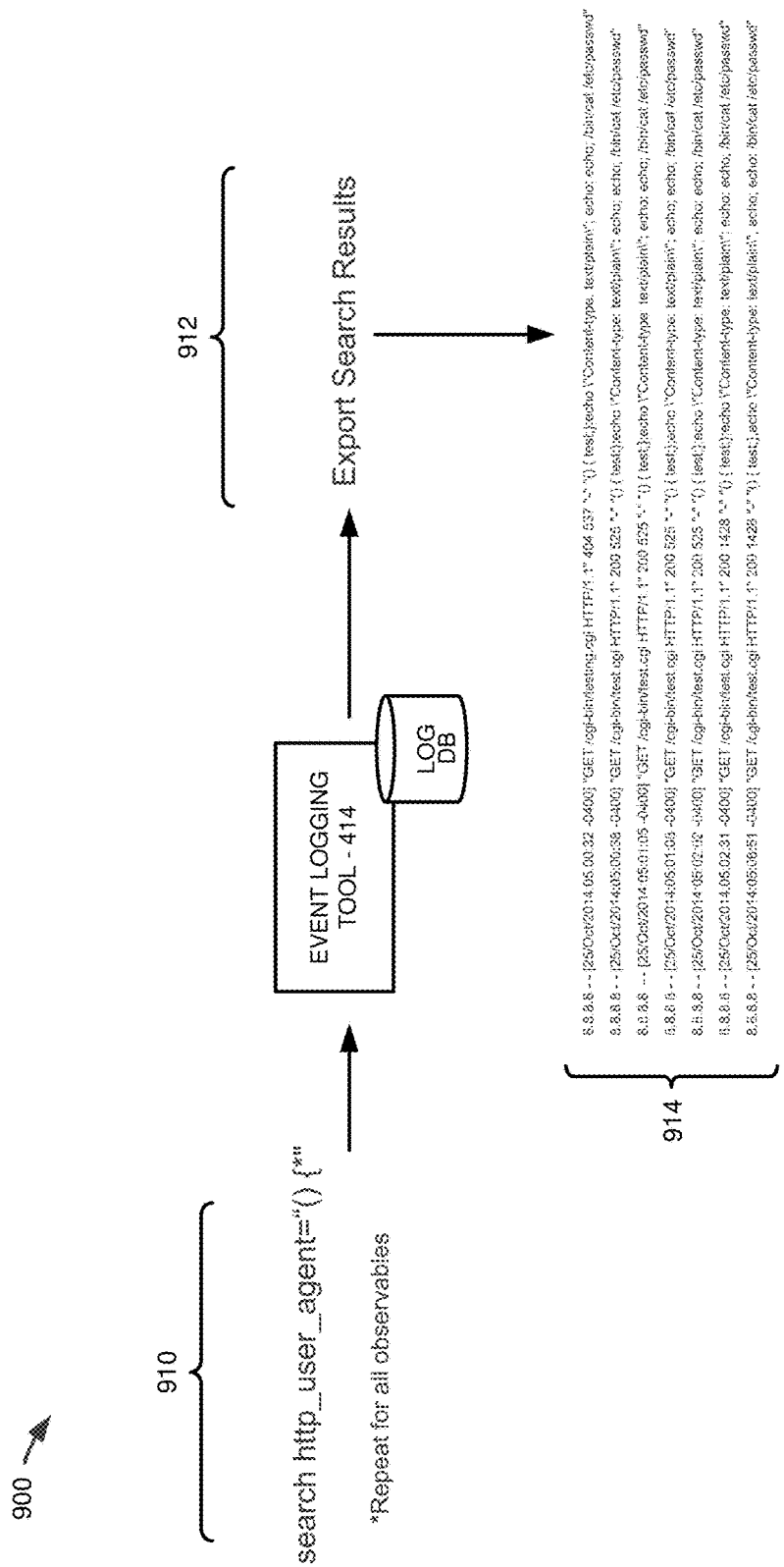
FIG. 9 is a schematic block diagram illustrating an example process for searching the log database of an event logging tool for results that match the converted search query.

FIG. 9 is a schematic block diagram 900 illustrating an example process for searching the log database of an event logging tool for results that match the converted search query. In the illustrated diagram 900, at 910, the converted search query is applied to the log database of the event logging tool 414. The converted search query at 910 corresponds to the converted version 812 but has the variables of the search query populated using the event-logging-tool specific structures, syntax, and/or data for the variables. At 912, the search results are generated and exported to the HEAVD tool. The search results are illustrated at 914 and, in the illustrated case, show numerous instances of the event log entries matching the search. The data retrieved can include other data associated with the matching entry, including, for example, an IP address, a date/time, and/or data showing other specifics of the matching entries. More generally, the data returned can comprise the timestamp from the event, IP address (if available) of who initiated the event, and the "raw log" which is the full event text that was collected by the logging tool.

At 520, the search results are analyzed to determine if any one or more of the observed vulnerabilities were exploited based on the search results from 518. This analysis can be performed on a respective asset on which a respective vulnerability was observed. The response can be a "yes/no" response, indicating whether or not a particular observed vulnerability was exploited or not. Further, the analysis can be performed by the HEAVD tool.

Figure 10:
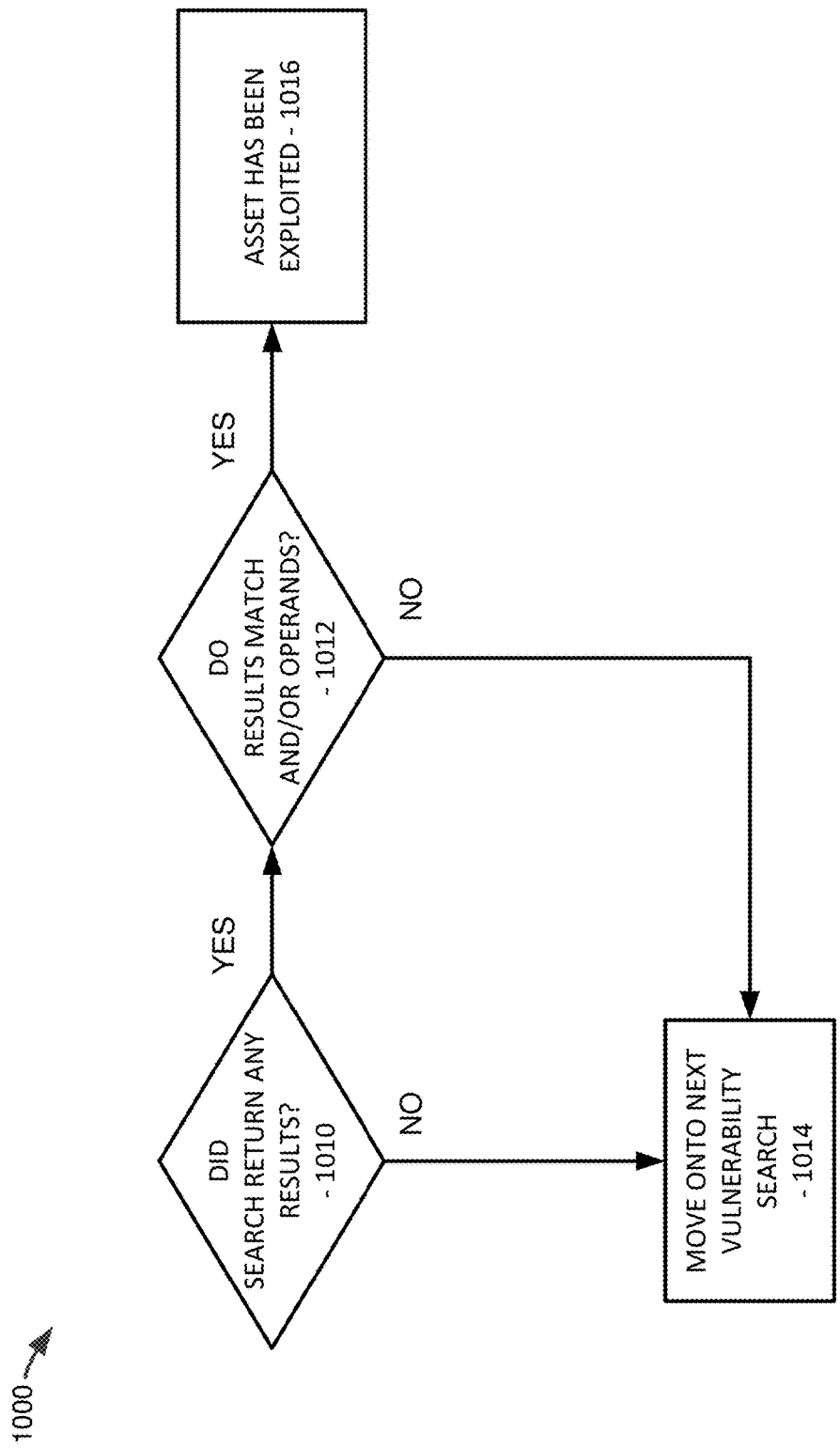
FIG. 10 is a flow chart illustrating an example process for determining whether a vulnerability was exploited for a particular vulnerability associated with one or more observables.

FIG. 10 is a flow chart 1000 illustrating an example process for determining whether a vulnerability was exploited for a particular vulnerability associated with one or more observables. At 1010, a determination is made as to whether the search returned any results. If so, the process proceeds to 1012; otherwise, the process progresses to the next vulnerability that was searched at 1014. At 1012, a determination is made as to whether the returned results satisfy the AND and/or OR operands specified as evidence of the exploitation of the vulnerability. For instance, the CybOX description of the vulnerability includes operand information indicating the Boolean conditions which, when satisfied, evidence an actual attack through the associated vulnerability. If the search results also satisfy the specified Boolean conditions for the one or more observables associated with the vulnerability, then at 1016 a determination can be made that the asset on which the vulnerability was observed was actually exploited. If the search results do not satisfy the Boolean conditions, then the process proceeds to the next vulnerability that was searched at 1014. If the vulnerability is determined to have been exploited (a "yes" response), further processing can be performed by process blocks 522-526.

At 522, for any vulnerabilities determined to have been exploited, additional information is obtained. In the illustrated embodiment, change audit reports from the asset on which the exploited vulnerability (or vulnerabilities) was observed are obtained from a security configuration management tool (e.g., tool 416) monitoring the asset. Additionally, in certain embodiments, the asset is tagged in the security configuration management tool as being an "exploited" asset. Tags are discussed in more detail in, for example, in U.S. patent application Ser. No. 13/597,242, filed on Aug. 28, 2012, entitled "Managing and Classifying Assets in an Information Technology Environment Using Tags", which is incorporated herein by reference in its entirety.

Figure 11:
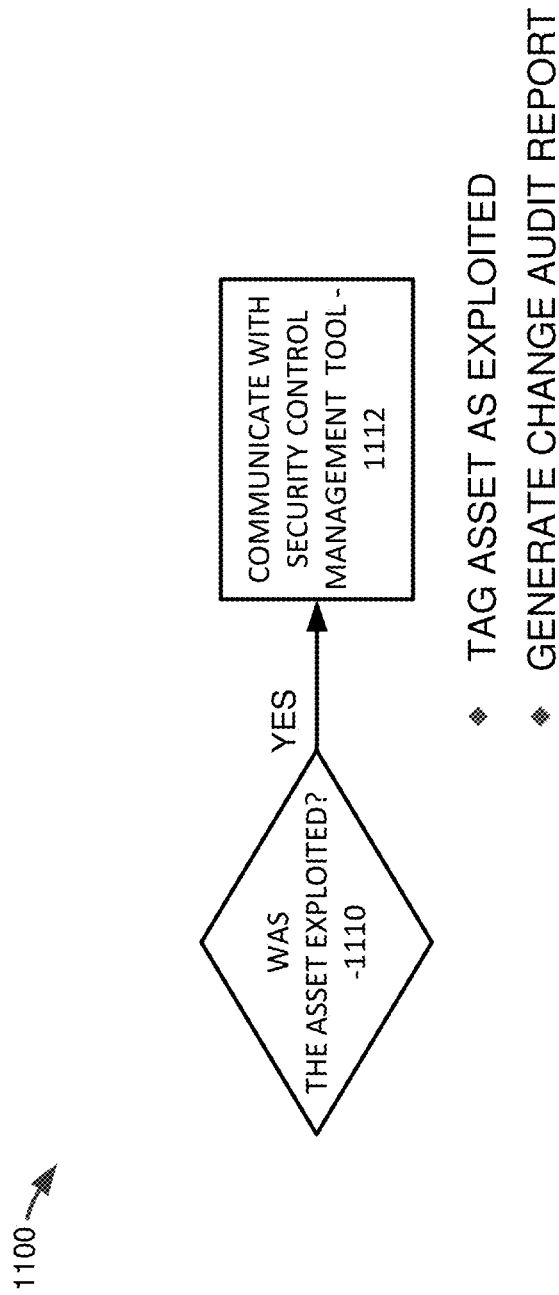
FIG. 11 is a schematic block diagram illustrating a process by which, if an asset was determined to be exploited, then a security configuration management tool also monitoring the asset can be communicated with to tag the asset as having been exploited and/or generate change audit reports for the asset.

FIG. 11 is a schematic block diagram 1100 illustrating a process by which, if an asset was determined to be exploited (as shown by block 1110 (corresponding to block 1016)), then at 1112, a security configuration management tool also monitoring the asset can be communicated with to: (1) tag the asset as having been exploited; and (2) generate change audit reports for the asset. Communication with the security configuration management tool can be performed using a suitable API (e.g., REST APIs) and can query the SCM tool for the change audit report using the hostname provided from the vulnerability scanning tool (e.g., from the IP360 XML2 file).

Figure 12:
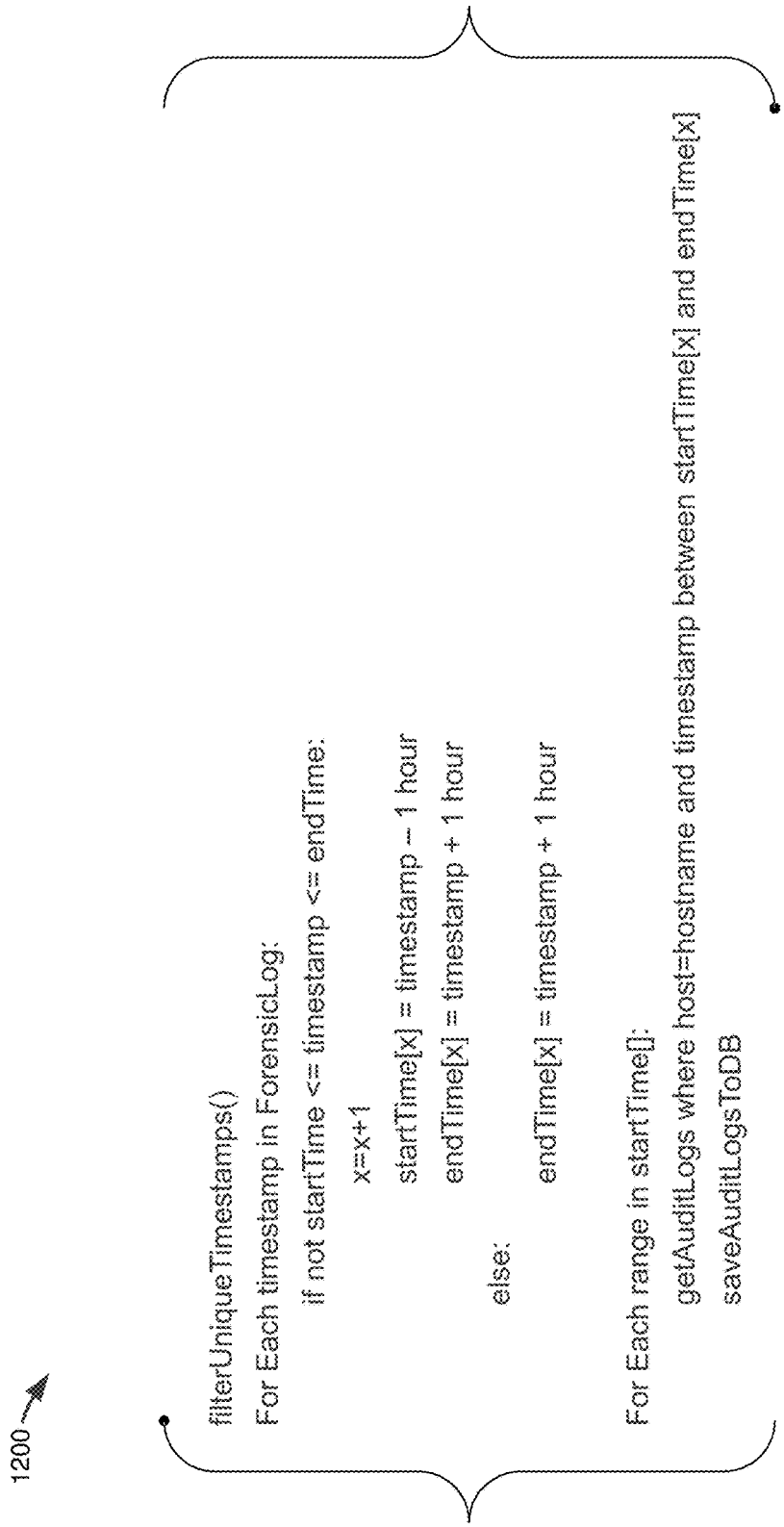
FIG. 12 is a diagram showing pseudocode for an example embodiment for performing an elastic time range search in accordance with embodiments of the disclosed technology.

The particular change audit report retrieved corresponds to a time frame around the time stamp of an event from the event log of the event logging tool evidencing an attack of the observed vulnerability. The search for the change audit report can be "elastic" in that a search for the change audit report can be adapted to include an increasingly broader time range based on whether a change audit report is found around a particular timestamp being searched. For instance, if an event in the event log is determined to represent a vulnerability being exploited, then a time frame around the timestamp of the event (e.g., +1 hour (or +m hours, m days, m minutes, m seconds, etc.) and −1 hour (or −n hours, n days, n minutes, n seconds, etc.)) can be searched. If no change audit report exists during that time frame, the time frame can be expanded (e.g., by increasing the upper limit of the time frame searched by 1 hour (or m hours, m days, m minutes, m seconds, etc.) and/or decreasing the lower limit of the time frame searched by 1 hour (or n hours, n days, n minutes, n seconds, etc.) If a change audit report exists during that time frame, then it can be stored for later reporting or use (e.g., the change audit report can include hashes of new or changed files that may represent threats to the security of the IT asset). In some example implementations, when a change audit report is found in the time frame around the event, the procedure can move to the next event in the event log determined to represent a vulnerability being exploited and the upper limit of the time frame for searching for change audit reports can be incrementally expanded until it encompasses the timestamp of the next event. FIG. 12 is a diagram showing pseudocode 1200 for an example embodiment for performing an elastic time range search in accordance with embodiments of the disclosed technology.

At 524, additional information can be obtained from third-party threat information providers. In particular embodiments, third-party threat intelligence is obtained related to the observed vulnerability and/or the observed perpetrator of the exploitation of the observed vulnerability (e.g., as determined from the event log and/or change audit reports). For example, additional data concerning the severity of the threat and/or whether the observed source of the threat is known can be obtained from a third-party service (e.g., Threatcloud or the like).

Figure 13:
FIG. 13 is a schematic block diagram illustrating pseudocode for an example request for additional information as can be made to a third-party service.

FIG. 13 is a schematic block diagram illustrating pseudocode 1300 for an example request for additional information as can be made to a third-party service. The illustrated request can use the IP address, hash, and/or other content data of the observed exploited vulnerability to request search third-party threat intelligence records and obtain additional information, such as: a CIF IP Score, VirusTotal IP Score, CIF Hash Score, and/or VirusTotal Hash Score. For instance, the hash and/or contents of a new or changed file and memorialized by the security configuration management tool in a change audit report can be sent to the third-party service. The additional information returned from the third-party threat intelligence provider can then be integrated with the information obtained from the vulnerability management tool 412, event logging tool 414, and the security configuration management tool 416 and, in some cases, stored in an integrated database for the observed and exploited vulnerability. The integrated information can then be used to generate a report (e.g., an interactive report) that is displayed and presented to the IT administrator.

At 526, a report is generated and displayed. In particular examples, the report is generated with integrated results from two or more of: the vulnerability management tool 412, event logging tool 414, security management tool 416, and/or the threat intelligence provider(s) 424. The report can be generated in the form of a user interface (e.g., presented via a web-based service or by a local application) having a series of screens that arrange and present selected information to the user. The screen can be navigated by selecting particular items in the screen. Example embodiments of suitable screens are illustrated in FIGS. 14-19, which are discussed below.

Figure 14:
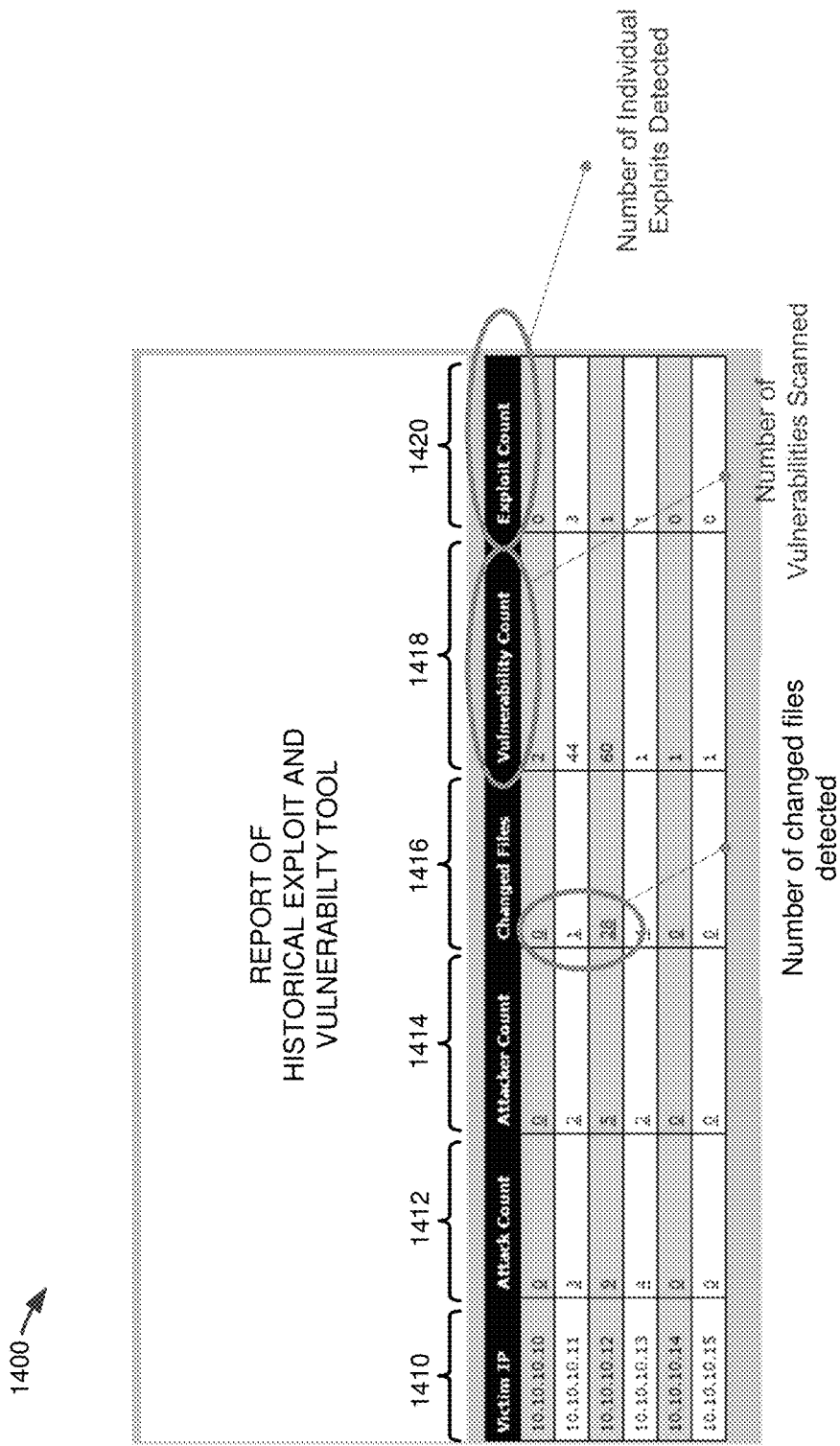

FIG. 14 illustrates a first example screen 1400 for presenting the integrated information. In particular, screen 1400 includes a first column 1410 ("victim IP") identifying the IP address of the exploited asset; a second column 1412 ("attack count") identifying a number of attacks on the exploited vulnerability; a third column 1414 ("attacker count") identifying a number of unique attackers (as identified by the IP addresses of the attack sources) responsible for the attacks; a fourth column 1416 ("changed files") identifying a number of changed files observed as a result of the attacks and as memorialized, for instance, by the SCM tool; a fifth column 1418 ("vulnerability count") identifying the number of vulnerabilities observed upon scanning the associated IP address of the exploited asset; and a sixth column 1420 ("exploit count") identifying the number of those vulnerabilities that were actually exploited as determined, for example, by performing the historical analysis of the log files from the event logging tool 414.

Figure 15:
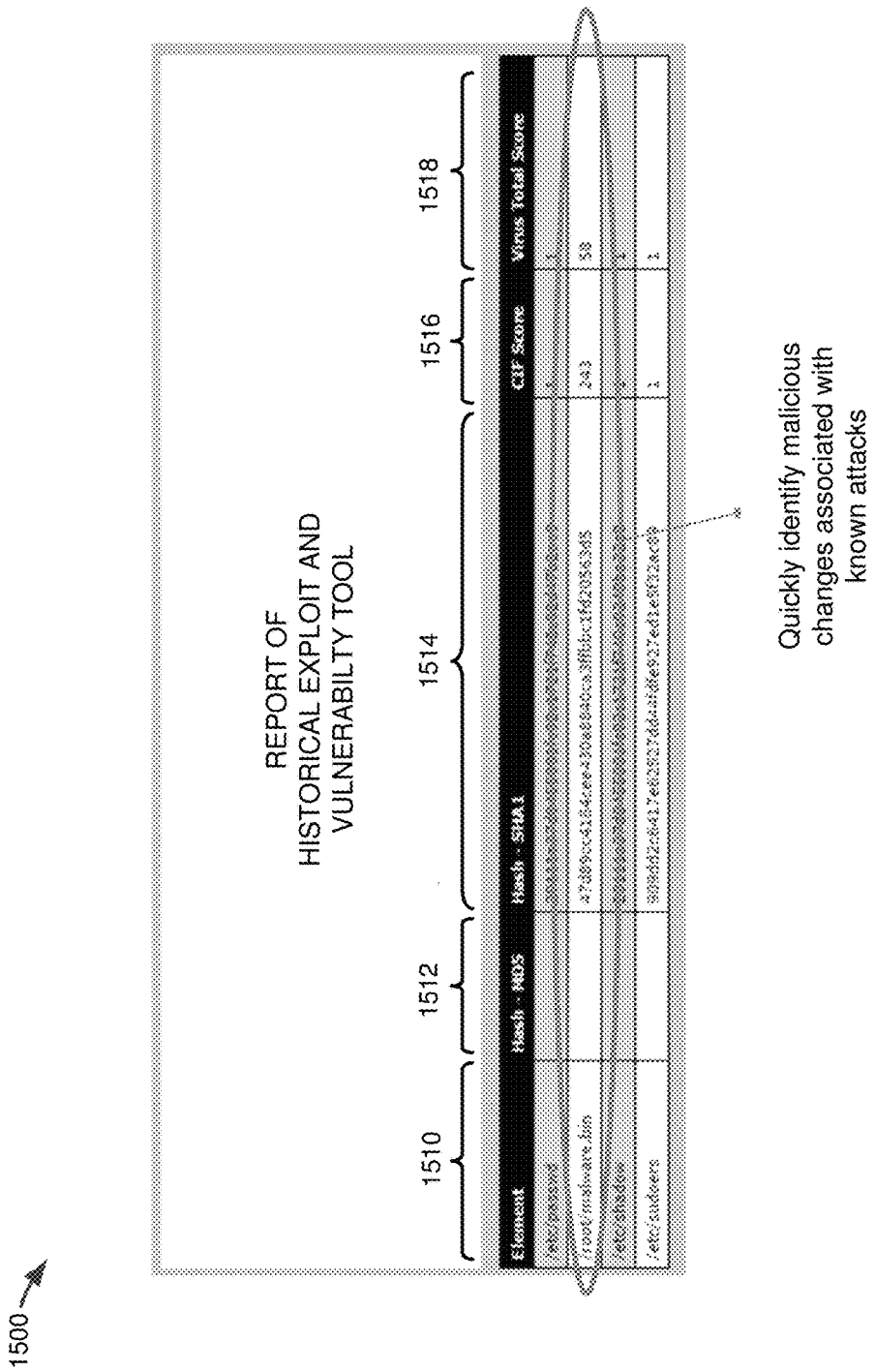

FIG. 15 illustrates a second example screen 1500 for presenting the integrated information. In particular, screen 1500 can be invoked by selecting an entry from the changed file column 1416. Screen 1500 includes a first column 1510 ("element") identifying an element name of the file that was changed; a second column 1512 ("Hash—MD5") indicating the hash of the element using the MD5 hash, if available; a third column 1514 ("Hash—SHA1") indicating the hash of the element using the SHA1 hash, if available; a fourth column 1516 ("CIF score") indicating a Collective Intelligence Framework ("CIF") score for the observed attack of the vulnerability and as obtained, for example, by a third-party threat intelligence provider 424; and a fifth column 1518 ("virus total score") indicating the virus total score and as also obtained, for example, by a third-party threat intelligence provider 424.

Figure 16:
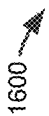

FIG. 16 illustrates a third example screen 1600 that is identical to FIG. 14 but highlights that the third column 1414 identifies a number of unique attackers detected.

Figure 17:
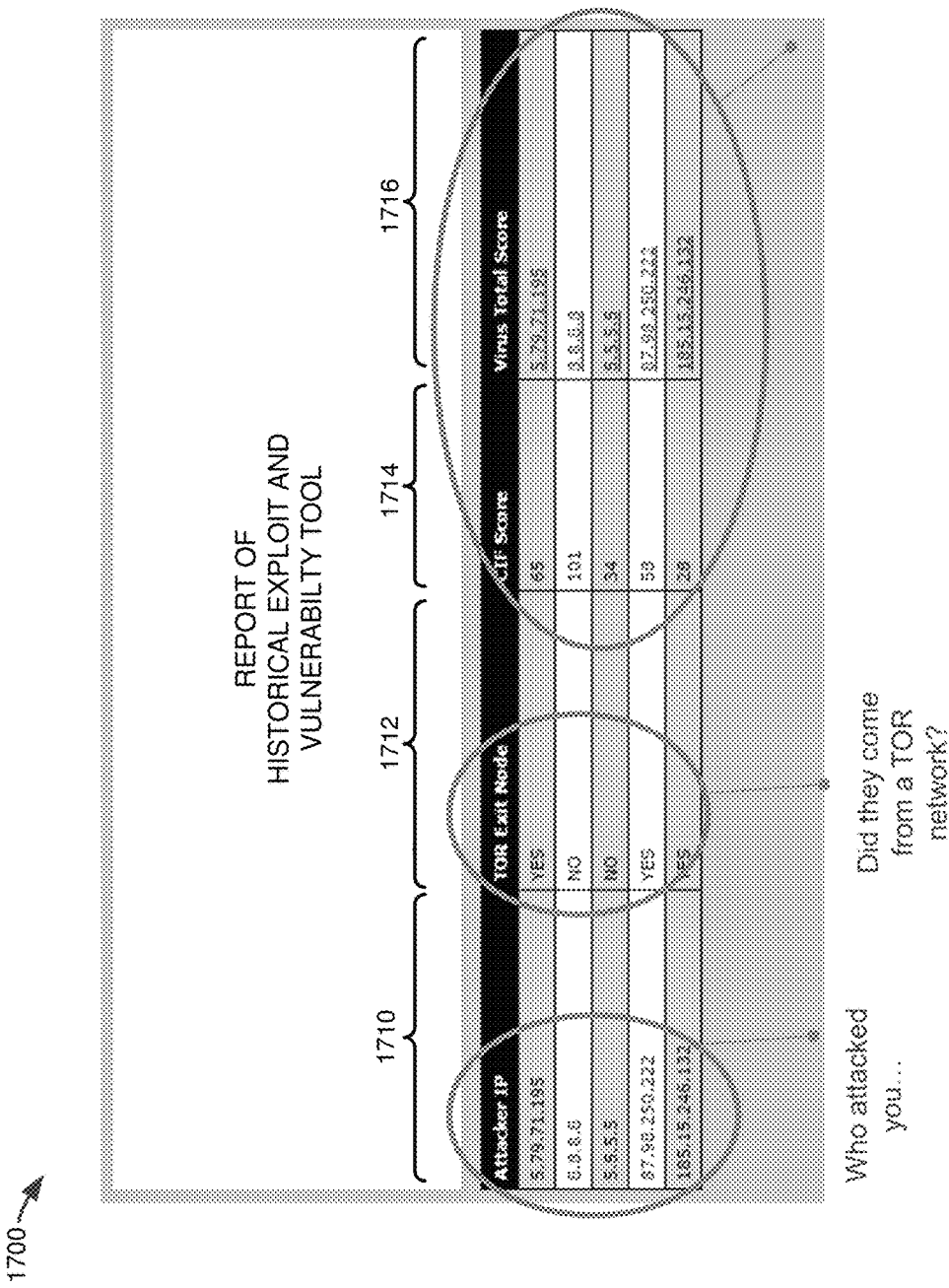

FIG. 17 illustrates a fourth example screen 1700 for presenting the integrated information. In particular, screen 1700 can be invoked by selecting an entry from the attacker count column 1414 of FIG. 16 and FIG. 14. Screen 1700 includes a first column 1710 ("attacker IP") identifying an IP address of the attacker; a second column 1712 ("TOR exit node") indicating whether the attack was from a TOR network (an anonymous network); a third column 1714 ("CIF score") indicating a CIF score and as obtained, for example, by a third-party threat intelligence provider 424; and a fourth column 1716 ("virus total score") that provides more information about a virus total score for the identified attacker and as also obtained, for example, by a third-party threat intelligence provider 424. In the illustrated embodiment, the fourth column 1716 shows the IP address of the attacker, which when selected, links directly to one or pages of a remote website maintained by the third-party intelligence provider 424 and providing additional information about the attacker.

Figure 18:
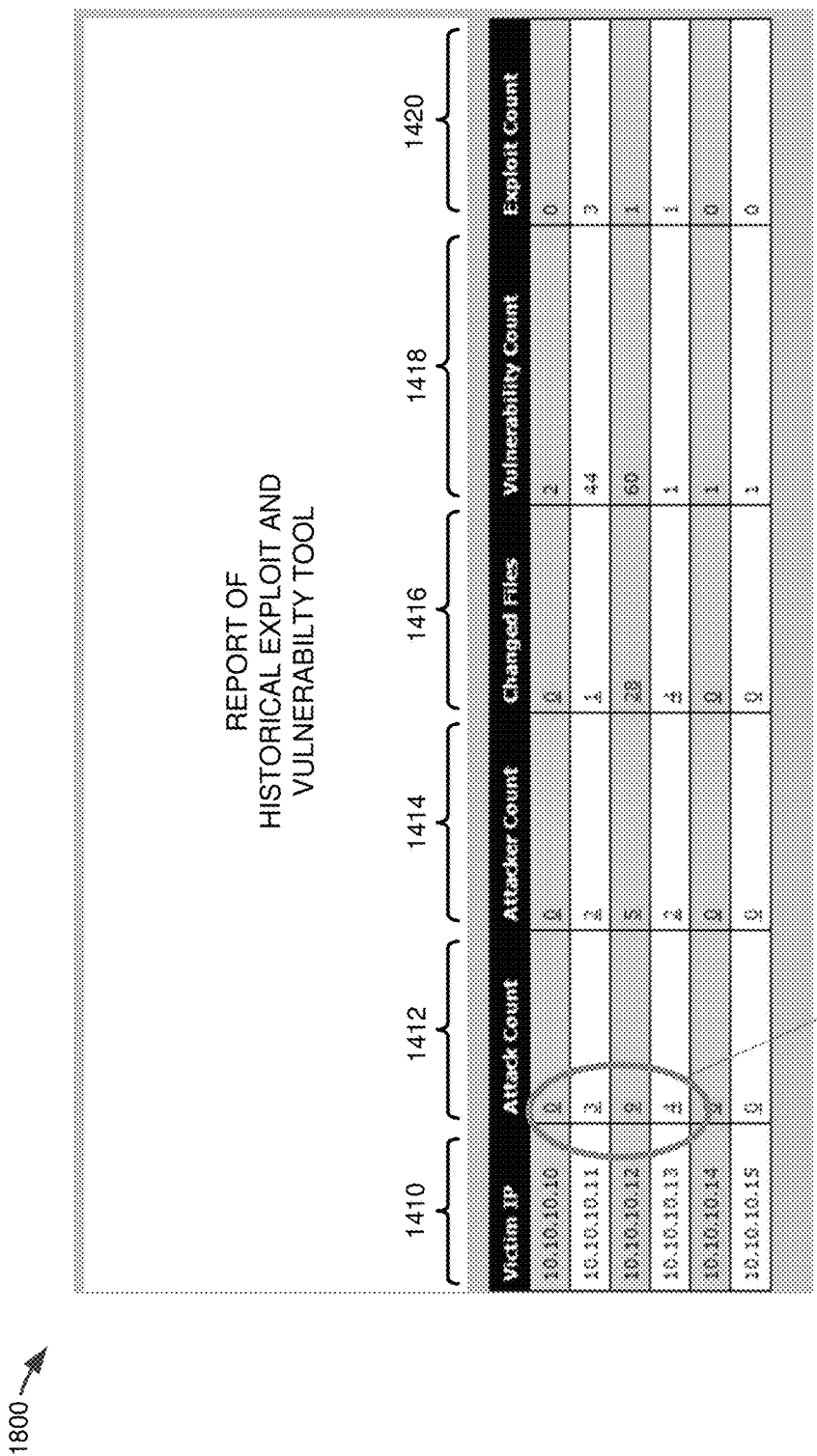

FIG. 18 illustrates a fifth example screen 1800 that is identical to FIG. 14 but highlights that the second column 1412 identifies a number of unique attacks detected.

Figure 19:
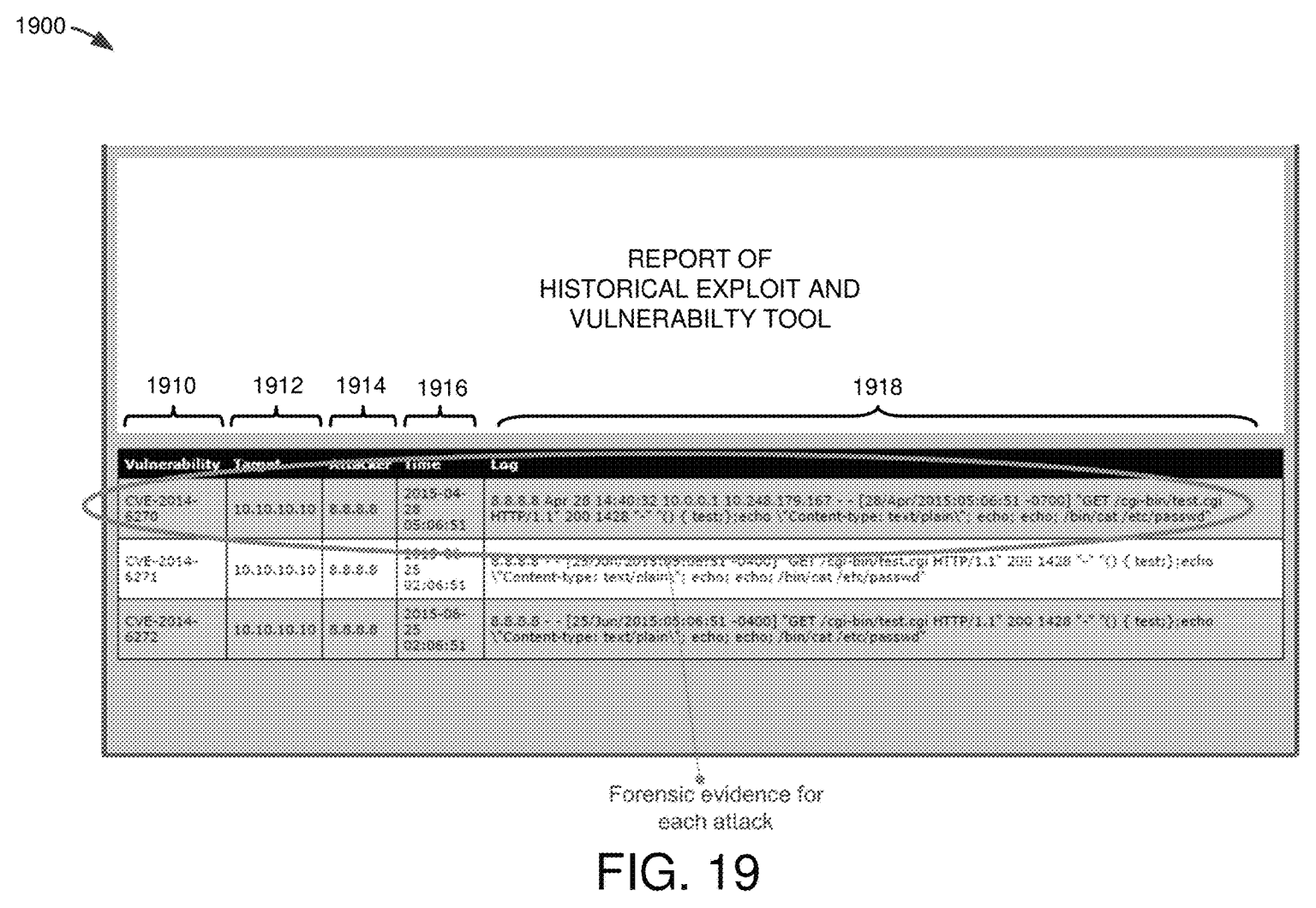

FIG. 19 illustrates a sixth example screen 1900 for presenting the integrated information. In particular, screen 1900 can be invoked by selecting an entry from the attack count column 1412 of FIGS. 18, 16, and 14. Screen 1900 includes a first column 1910 ("vulnerability") identifying a vulnerability ID number; a second column 1912 ("target") indicating the IP address of the asset on which the vulnerability was observed; a third column 1914 ("attacker") indicating an IP address of the source of the attack on the vulnerability and as obtained, for example, by the event log from the event logging tool 414; a fourth column 1916 ("time") indicating a date and time of the attack and as obtained, for example, by the event log from the event logging tool 414; and a fifth column 1918 ("log") indicating data of the attack (e.g., the one or more observables that evidence the attack).

Based on this information, an IT administrator viewing and/or analyzing the report can decide to, among other things, gather more information or reconfigure the asset on which the exploited vulnerability was observed. For instance, in response to any of the generated data and/or reports, one or more of the assets experiencing exploited vulnerabilities can be modified to address and fix the vulnerability, thereby increasing the security of the asset as well as the overall security of the IT infrastructure. The vulnerabilities can be patched, for example, through appropriate software updates that alter the overall configuration state of an asset with an exploited vulnerability. This modification to the state of the exploited asset can be automatically performed (e.g., using the SCM tool or other software tool) or, in some cases, performed directly by an IT administrator.

IV. Concluding Remarks

Having illustrated and described the principles of the disclosed technology, it will be apparent to those skilled in the art that the disclosed embodiments can be modified in arrangement and detail without departing from such principles. For example, any one or more aspects of the disclosed technology can be applied in other embodiments.

In view of the many possible embodiments to which the principles of the disclosed technologies can be applied, it should be recognized that the illustrated embodiments are only preferred examples of the technologies and should not be taken as limiting the scope of the invention.

What is claimed is:

1. A method for improving security of networked information technology ("IT") assets in an IT infrastructure, comprising:
performing a vulnerability scan for one or more of the networked IT assets;
for a detected vulnerability of a respective one of the networked IT assets, determining one or more observables that indicate exploitation of the detected vulnerability;
searching a historic event log of the respective one of the networked IT assets for the one or more observables; and
determining whether the detected vulnerability was exploited in a past attack at the respective one of the networked IT assets using results of the searching;
wherein the determining the one or more observables that indicate exploitation of the detected vulnerability comprises:
converting a result from the vulnerability scan into a STIX (structured threat information expression) language expression including a common vulnerability enumeration (CVE) value; and
extracting the one or more observables from a vulnerability database using the STIX language expression.

2. The method of claim 1, further comprising:
upon determining that the detected vulnerability was exploited in the past attack, altering a tag for the respective one of the networked IT assets in a security configuration management tool to a state indicating that the respective one of the networked IT assets has been exploited.

3. The method of claim 1, further comprising:
upon determining that the detected vulnerability was exploited in the past attack, obtaining one or more change audit reports from a security configuration management tool, the change audit reports including data concerning file changes performed at the respective one of the networked IT assets.

4. The method of claim 3, wherein the obtaining the one or more change audit reports comprises retrieving change audit reports from a time frame that encompasses a time of a first set of one or more observables for the detected vulnerability and that is expanded to further encompass a time of a second set of one or more observables for the detected vulnerability.

5. The method of claim 1, further comprising:
upon determining that the detected vulnerability was exploited in a past attack, obtaining data from a third-party threat intelligence service indicating one or more of a severity of the past attack or an identity of a source of the past attack.

6. The method of claim 1, further comprising:
modifying the respective one of the networked IT assets to remedy the vulnerability.

7. The method of claim 1, wherein the searching of the historic event log of the respective one of the networked IT assets for the one or more observables is an adaptive search performed by:
searching for the one or more observables in a first historic time frame; and
conditional on the one or more observables not being found or being found in the first historic time frame, searching for the one or more observables in a second historic time frame earlier than the first historic time frame.

8. The method of claim 1, wherein the one or more observables are specified as a CybOX description characterized by Boolean operators that indicate conditions which, when satisfied, evidence an actual attack through the detected vulnerability.

9. The method of claim 1, wherein the vulnerability database is a remote third-party vulnerability database.

10. The method of claim 1, further comprising:
displaying an integrated report visually indicating one or more of: (a) an IP address of the respective one of the networked IT assets, (b) an attack count value identifying a number of attacks of the detected vulnerability, (c) an attacker count value identifying a number of unique attackers responsible for the attacks, (d) a changed files value identifying a number of changed files observed at the respective one of the networked IT assets as a result of the attacks and as memorialized by an security configuration management tool monitoring the IT assets, (e) a vulnerability count value identifying a number of vulnerabilities observed at the respective one of the networked IT assets upon perform the vulnerability scan, or (f) an exploit count value identifying a number of those vulnerabilities that were actually exploited.

11. The method of claim 1, further comprising:
displaying an integrated report visually indicating one or more of: (a) a vulnerability ID value for the detected vulnerability; (b) a target value indicating an IP address of the asset on which the detected vulnerability was observed; (c) an attacker ID value indicating an IP address of a source of the attack on the detected vulnerability; (d) a time value indicating a date and time of the attack; or (e) log data indicating the one or more observables that evidence the attack.

12. One or more non-transitory computer-readable media storing computer-executable instructions, which when executed by a computer cause the computer to perform a method, the method comprising:
searching a historic event log of an IT asset for one or more observables, the one or more observables being events or properties that evidence exploitation of a vulnerability at the IT asset;
determining that the vulnerability was exploited in one or more past attacks of the IT asset using results of the searching;
searching a bounded time frame encompassing the times of the one or more past attacks to obtain one or more change audit reports from a security configuration management tool, the change audit reports including data concerning file changes performed at the IT asset in the bounded time frame; and
displaying an integrated report that reports the one or more past attacks of the IT asset together with change data obtained from the change audit reports.

13. The one or more non-transitory computer-readable media of claim 12, wherein the searching the historic event log is performed in an adaptive process that expands a historic time frame searched conditionally upon not finding evidence of a past attack exploiting the vulnerability of the IT asset in a smaller historic time frame.

14. The one or more non-transitory computer-readable media of claim 12, wherein the method further comprises obtaining data from a third-party threat intelligence service indicating one or more of a severity of the past attacks or an identity of a source of the past attacks, and wherein the integrated report includes the one or more of the severity of the past attacks or the identity of the source of the past attacks.

15. The one or more non-transitory computer-readable media of claim 12, wherein the one or more observables are specified as a CybOX description characterized by Boolean operators that indicate conditions which, when satisfied, evidence an actual attack through the vulnerability.

16. A system comprising:
- a vulnerability scanner configured to perform a vulnerability scan for one or more of the networked IT assets;
- a historical exploit and vulnerability detection tool configured to perform a past attack detection process comprising:
  - for a detected vulnerability of a respective one of the networked IT assets, determining one or more observables that indicate exploitation of the detected vulnerability;
  - searching a historic event log of the respective one of the networked IT assets for the one or more observables; and
  - determining whether the detected vulnerability was exploited in the past attack at the respective one of the networked IT assets using results of the searching;
  - searching a bounded time frame encompassing the times of the one or more past attacks to obtain one or more change audit reports from a security configuration management tool, the change audit reports including data concerning file changes performed at the IT asset in the bounded time frame; and
  - displaying an integrated report that reports the one or more past attacks of the IT asset together with change data obtained from the change audit reports.

17. The system of claim 16, wherein the historical exploit and vulnerability detection tool is further configured to determine the one or more observables that indicate exploitation of the detected vulnerability by:

converting a result from the vulnerability scan into a standardized threat information expression including a common vulnerability enumeration (CVE) value; and
extracting the one or more observables from a third-party remote vulnerability database using the standardized threat information expression.

18. The system of claim 16, wherein the historical exploit and vulnerability detection tool is further configured to:
retrieve additional threat information concerning the exploitation from a third party remote threat intelligence provider.

19. The system of claim 16, wherein the historical exploit and vulnerability detection tool is further configured to:
display an integrated report visually indicating an IP address of the respective one of the networked IT assets and one or more of: (a) an attack count value identifying a number of attacks of the detected vulnerability, (b) an attacker count value identifying a number of unique attackers responsible for the attacks, (c) a changed files value identifying a number of changed files observed at the respective one of the networked IT assets as a result of the attacks and as memorialized by an security configuration management tool monitoring the IT assets, (d) a vulnerability count value identifying a number of vulnerabilities observed at the respective one of the networked IT assets upon perform the vulnerability scan, (e) an exploit count value identifying a number of those vulnerabilities that were actually exploited, (f) a vulnerability ID value for the detected vulnerability; (g) a target value indicating an IP address of the asset on which the detected vulnerability was observed; (h) an attacker ID value indicating an IP address of a source of the attack on the detected vulnerability; (i) a time value indicating a date and time of the attack; or (j) log data indicating the one or more observables that evidence the attack.

\* \* \* \* \*

UNITED STATES PATENT AND TRADEMARK OFFICE
CERTIFICATE OF CORRECTION

PATENT NO. : 10,454,963 B1
APPLICATION NO. : 15/225639
DATED : October 22, 2019
INVENTOR(S) : Smith Page 1 of 1

It is certified that error appears in the above-identified patent and that said Letters Patent is hereby corrected as shown below:

In the Claims

Column 22, Line 22, Claim 10 "one of the networked IT assets upon perform the" should read --one of the networked IT assets upon performing the--.

Column 24, Line 27, Claim 19 "one of the networked IT assets upon perform the" should read --one of the networked IT assets upon performing the--.

Signed and Sealed this
Third Day of March, 2020

Andrei Iancu
*Director of the United States Patent and Trademark Office*